(12) United States Patent
Frankowski et al.

(10) Patent No.: US 9,790,817 B2
(45) Date of Patent: *Oct. 17, 2017

(54) TENSIONER WITH INCREASED DAMPING

(71) Applicant: LITENS AUTOMOTIVE PARTNERSHIP, Woodbridge (CA)

(72) Inventors: Marek Frankowski, Innisfil (CA); Dino Farronato, Brampton (CA); Rares I. Comsa, Newmarket (CA); Frank C. Schimpl, Toronto (CA)

(73) Assignee: LITENS AUTOMOTIVE PARTNERSHIP, Woodbridge, Ontario (CA)

( * ) Notice: Subject to any disclaimer, the term of this patent is extended or adjusted under 35 U.S.C. 154(b) by 11 days.

This patent is subject to a terminal disclaimer.

(21) Appl. No.: 14/437,310

(22) PCT Filed: Oct. 22, 2013

(86) PCT No.: PCT/CA2013/000901
§ 371 (c)(1),
(2) Date: Apr. 21, 2015

(87) PCT Pub. No.: WO2014/063228
PCT Pub. Date: May 1, 2014

(65) Prior Publication Data
US 2015/0275706 A1 Oct. 1, 2015

Related U.S. Application Data

(60) Provisional application No. 61/716,894, filed on Oct. 22, 2012.

(51) Int. Cl.
*F01L 1/02* (2006.01)
*F02B 67/06* (2006.01)
(Continued)

(52) U.S. Cl.
CPC ............. *F01L 1/02* (2013.01); *F02B 67/06* (2013.01); *F16F 7/06* (2013.01); *F16H 7/12* (2013.01);
(Continued)

(58) Field of Classification Search
CPC .... F16H 7/1218; F16H 2007/081; F16H 7/12; F16H 7/1209; F16H 2007/084; F01L 1/02; F16F 7/06
(Continued)

(56) References Cited

U.S. PATENT DOCUMENTS 1,667,117 A 4/1928 Ireland
2,002,081 A 5/1935 Dow
(Continued)

FOREIGN PATENT DOCUMENTS

CA 2446188 C 6/2007
CN 100540946 C 10/2004
(Continued)

OTHER PUBLICATIONS

Automotive Handbook (Second Edition), p. 78, Robert Bosch GmbH/Society of Automotive Engineers, 1986.
(Continued)

*Primary Examiner* — Ching Chang
(74) *Attorney, Agent, or Firm* — Millman IP, Inc.

(57) ABSTRACT

In an aspect, a tensioner for an endless drive member, comprising a shaft and base that are mountable to be stationary relative to an engine, a tensioner arm that is pivotable relative to the shaft about a tensioner arm axis, a pulley on the tensioner arm rotatable about a pulley axis that is offset from the tensioner arm axis, and that is engageable with an endless drive member, a tensioner spring that is positioned to urge the tensioner arm towards a free arm position, a damping element that engages the tensioner arm
(Continued)

and that is engaged by a plurality of axially spaced segments of the tensioner spring.

20 Claims, 26 Drawing Sheets

(51) Int. Cl.
| | | |
|---|---|---|
| *F16H 7/12* | (2006.01) | |
| *F16F 7/06* | (2006.01) | |
| *F16H 7/08* | (2006.01) | |

(52) U.S. Cl.
CPC .......... *F16H 7/1209* (2013.01); *F16H 7/129* (2013.01); *F16H 7/1218* (2013.01); *F16H 2007/081* (2013.01); *F16H 2007/084* (2013.01); *F16H 2007/0893* (2013.01)

(58) Field of Classification Search
USPC ...... 123/90.31, 90.65, 90.16, 90.27; 474/101
See application file for complete search history.

(56) References Cited

U.S. PATENT DOCUMENTS

| | | |
|---|---|---|
| 2,051,488 A | 8/1936 | Kottlowski et al. |
| 2,054,023 A | 9/1936 | McCann |
| 2,196,255 A | 4/1940 | Dow |
| 2,210,276 A | 8/1940 | Bremner |
| 3,426,606 A | 2/1969 | Hopkins |
| 3,528,533 A | 9/1970 | Sacchini |
| 3,618,721 A | 11/1971 | Hare |
| 3,756,091 A | 9/1973 | Miller |
| 3,811,332 A | 5/1974 | Brown |
| 3,838,606 A | 10/1974 | Scalise |
| 3,924,481 A | 12/1975 | Gregg |
| 4,384,725 A | 5/1983 | Nenov |
| 4,392,840 A | 7/1983 | Radocaj |
| 4,395,250 A | 7/1983 | King |
| 4,515,577 A | 5/1985 | Cathey et al. |
| 4,553,952 A | 11/1985 | Tangorra et al. |
| 4,696,663 A | 9/1987 | Thomey et al. |
| 4,824,421 A | 4/1989 | Komorowski |
| 4,917,655 A | 4/1990 | Martin |
| 4,921,472 A | 5/1990 | Young |
| 4,923,435 A | 5/1990 | Kadota et al. |
| 4,934,987 A | 6/1990 | Kadota |
| 4,934,988 A | 6/1990 | Kawamura |
| 5,011,460 A | 4/1991 | Ouchi et al. |
| 5,030,171 A | 7/1991 | Henderson |
| 5,052,982 A | 10/1991 | Ouchi |
| 5,078,656 A | 1/1992 | Brandenstein |
| 5,149,306 A | 9/1992 | Sidwell |
| 5,156,573 A | 10/1992 | Byztek et al. |
| 5,171,188 A | 12/1992 | Lardrot et al. |
| 5,244,438 A | 9/1993 | Golovatai-Schmidt |
| 5,246,404 A | 9/1993 | Ojima |
| 5,266,067 A | 11/1993 | Gapco |
| RE34,543 E | 2/1994 | Komorowski et al. |
| 5,328,415 A | 7/1994 | Furutani et al. |
| 5,354,242 A | 10/1994 | St. John |
| 5,421,788 A | 6/1995 | Toth |
| 5,599,245 A | 2/1997 | Giese |
| 5,620,385 A | 4/1997 | Cascionale et al. |
| 5,702,314 A | 12/1997 | Schmid |
| 5,759,125 A | 6/1998 | Berg |
| 5,964,674 A | 10/1999 | Serkh et al. |
| 5,967,919 A | 10/1999 | Bakker |
| 6,039,664 A | 3/2000 | Schmid |
| 6,102,820 A | 8/2000 | Imaharu et al. |
| 6,165,091 A | 12/2000 | Dinca et al. |
| 6,196,940 B1 | 3/2001 | Lehtovaara |
| 6,264,578 B1 | 7/2001 | Ayukawa |
| 6,375,588 B1 | 4/2002 | Frankowski et al. |
| 6,416,435 B1 | 7/2002 | Szatkowski et al. |
| 6,422,962 B1 | 7/2002 | Lehtovaara et al. |
| 6,422,963 B2 | 7/2002 | Kurose |
| 6,428,435 B1 | 8/2002 | Kumakura et al. |
| 6,450,907 B1 | 9/2002 | Serkh |
| 6,468,172 B1 | 10/2002 | Lang et al. |
| 6,524,202 B1 | 2/2003 | Tada |
| 6,592,482 B2 | 7/2003 | Serkh |
| 6,623,391 B2 | 9/2003 | Young et al. |
| 6,857,977 B1 | 2/2005 | Bertelshofer et al. |
| 6,857,978 B2 | 2/2005 | Polster et al. |
| 6,932,731 B2 | 8/2005 | Kaiser et al. |
| 7,273,432 B2 | 9/2007 | Schonmeier et al. |
| 7,285,065 B2 | 10/2007 | Dinca et al. |
| 7,371,199 B2 | 5/2008 | Joslyn |
| 7,507,172 B2* | 3/2009 | Lehtovaara ........... F16D 41/206 474/109 |
| 7,588,507 B2 | 9/2009 | Ayukawa et al. |
| 7,637,829 B2 | 12/2009 | Stone et al. |
| 7,686,719 B2 | 3/2010 | Joslyn et al. |
| 7,803,078 B2 | 9/2010 | D'Silva et al. |
| 7,837,582 B2 | 11/2010 | Smith et al. |
| 7,874,950 B2 | 1/2011 | Lehtovaara et al. |
| 8,038,555 B2 | 10/2011 | Pendergrass et al. |
| 8,057,333 B2 | 11/2011 | Haesloop |
| 8,083,623 B2 | 12/2011 | Cantatore et al. |
| 8,613,680 B2 | 12/2013 | Frankowski et al. |
| 8,672,785 B2 | 3/2014 | Young |
| 8,677,963 B2 | 3/2014 | Stoltz-Douchet et al. |
| 8,690,718 B2* | 4/2014 | Cantatore ............. F16H 7/1218 474/101 |
| 2002/0045503 A1 | 4/2002 | Young et al. |
| 2002/0142872 A1 | 10/2002 | Tada |
| 2002/0160868 A1 | 10/2002 | Wigstein et al. |
| 2003/0078124 A1 | 4/2003 | Serkh |
| 2003/0098215 A1 | 5/2003 | Miller et al. |
| 2004/0005953 A1 | 1/2004 | Yonezawa et al. |
| 2004/0053719 A1 | 3/2004 | Gibson |
| 2004/0166975 A1 | 8/2004 | Gibson |
| 2006/0035740 A1 | 2/2006 | Lehtovaara et al. |
| 2008/0026894 A1 | 1/2008 | Dinca et al. |
| 2008/0058141 A1 | 3/2008 | Pendergrass et al. |
| 2008/0058142 A1 | 3/2008 | Joslyn |
| 2008/0058143 A1 | 3/2008 | Fukuda |
| 2008/0139353 A1 | 6/2008 | Stepniak et al. |
| 2008/0176687 A1 | 7/2008 | Schever |
| 2008/0287233 A1 | 11/2008 | Cantatore |
| 2009/0011881 A1 | 1/2009 | Lehtovaara et al. |
| 2009/0131208 A1 | 5/2009 | Hawryluck et al. |
| 2009/0176609 A1 | 7/2009 | Lehtovaara et al. |
| 2010/0113199 A1 | 5/2010 | Pflug |
| 2010/0145559 A1 | 6/2010 | Gauthier et al. |
| 2010/0145591 A1 | 6/2010 | Rolando |
| 2011/0256969 A1 | 10/2011 | Frankowski et al. |
| 2012/0040789 A1 | 2/2012 | Cantatore |
| 2014/0051533 A1 | 2/2014 | Yoneda et al. |
| 2014/0287859 A1 | 9/2014 | Frankowski et al. |

FOREIGN PATENT DOCUMENTS

| | | |
|---|---|---|
| CN | 1959150 A | 6/2006 |
| CN | 101755147 A | 6/2007 |
| DE | 3716571 C1 | 1/1989 |
| DE | 102005002253 A1 | 9/2005 |
| DE | 102007015676 A1 | 10/2008 |
| DE | 102007031294 A1 | 1/2009 |
| EP | 450620 A1 | 10/1991 |
| EP | 1368583 B1 | 10/2008 |
| EP | 2239483 B1 | 9/2012 |
| EP | 2464893 B1 | 5/2013 |
| GB | 2328998 A | 3/1999 |
| JP | 60-52433 U | 4/1985 |
| JP | 2004-132390 A | 4/2004 |
| JP | 2004-204954 A | 7/2004 |
| JP | 2005-511984 A | 4/2005 |
| JP | 03652177 B2 | 5/2005 |
| JP | 2006-170435 A | 6/2006 |
| JP | 2011202778 A | 10/2011 |
| KR | 10-20050044684 A | 5/2005 |
| WO | 0113009 A1 | 2/2001 |
| WO | 0146603 A1 | 6/2001 |

(56) References Cited

FOREIGN PATENT DOCUMENTS

| WO | 03048606 A1 | 6/2003 |
|----|----|----|
| WO | 2006105656 A1 | 10/2006 |
| WO | 2007066363 A1 | 6/2007 |
| WO | 2008068782 A1 | 6/2008 |
| WO | 2008149389 A1 | 12/2008 |
| WO | 2009106180 A1 | 9/2009 |
| WO | 2011018297 A1 | 2/2011 |
| WO | 2012147957 A1 | 11/2012 |
| WO | 2013059929 A1 | 5/2013 |
| WO | 2013148477 A1 | 10/2013 |
| WO | 2014063228 A1 | 5/2014 |

OTHER PUBLICATIONS

Development of Simulation Model for Calculating Loads to Synchronous Drive Belt (SAE Paper 930622), Mar. 1, 1993, Uchida et al.
International Search Report and Written Opinion for PCT/CA2013/000901, dated Feb. 3, 2014, ISA.
International Preliminary Report on Patentability for PCT/CA2013/000901, dated Apr. 28, 2015, ISA.
Office Action for JP2013505285 dated Mar. 3, 2015.
Office Action dated Mar. 26, 2015 for CN201180019579 (SIPO).
Office Action dated Mar. 26, 2015 for JP2013505285 (JPO).
ESR for EP15164688 dated Oct. 29, 2015.
International Preliminary Report on Patentability for PCT/CA2011/000445 dated Oct. 23, 2012.
ISR and WO for PCT/CA2014/000689 dated Dec. 15, 2014.
Office Action for U.S. Appl. No. 14/260,282 dated Oct. 18, 2016.
Office Action for CN201380055354 dated Nov. 16, 2016.
Reporting letter for Office Action for CN201380055354 dated Nov. 16, 2016.
English translation of Office Action for CN201380055354 dated Nov. 16, 2016.
Office Action for U.S. Appl. No. 14/917,743 dated May 15, 2017.
Office Action for CN201380055354 dated Jul. 3, 2017.
Office Action for CN201380055354 dated Jul. 3, 2017—English translation.
Notice of Preliminary Rejection of KR10-2012-7027217 dated May 18, 2017.
Translation of the Notice of Preliminary Rejection of KR10-2012-7027217 dated May 18, 2017.

* cited by examiner

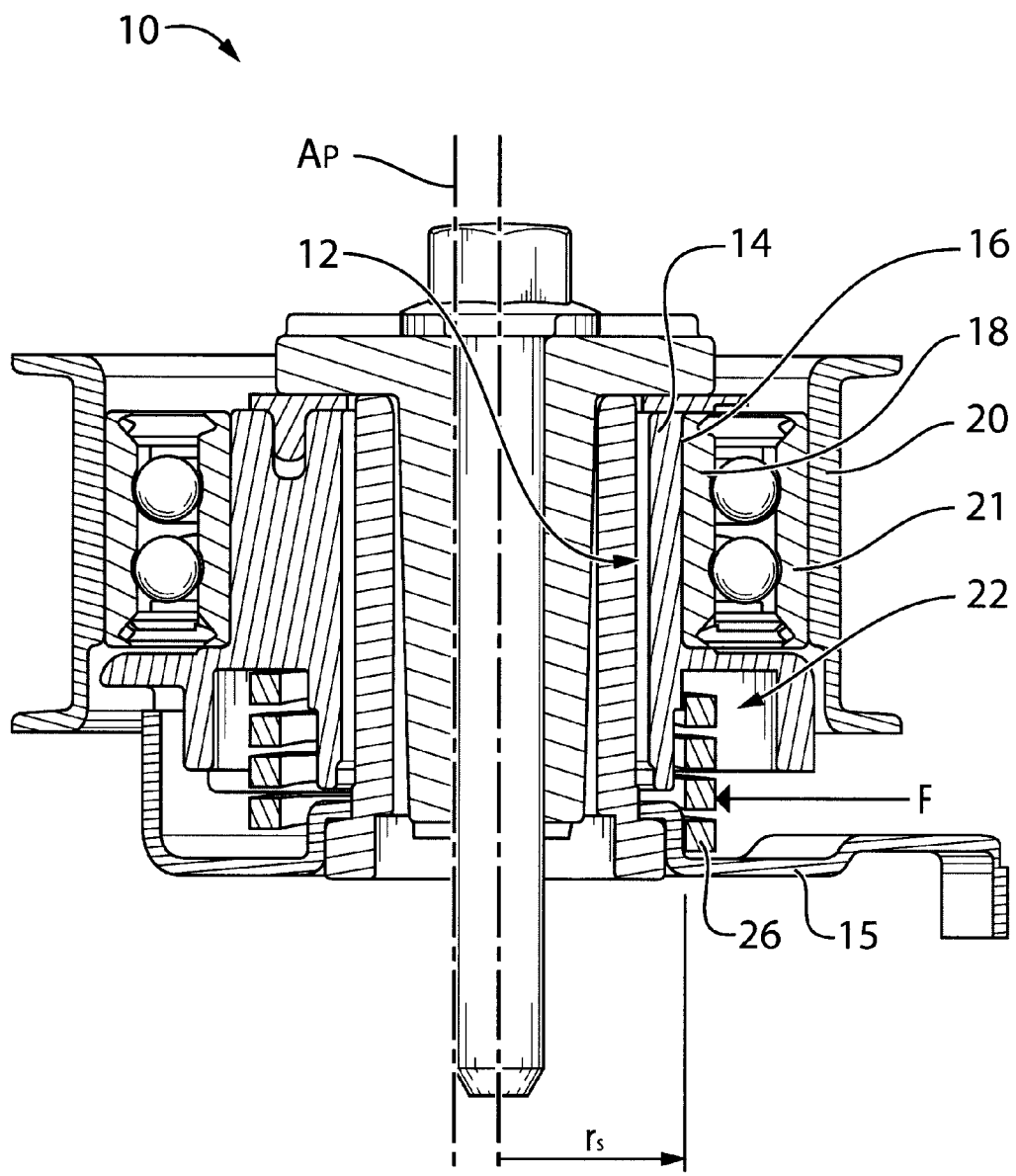
PRIOR ART    FIG.1

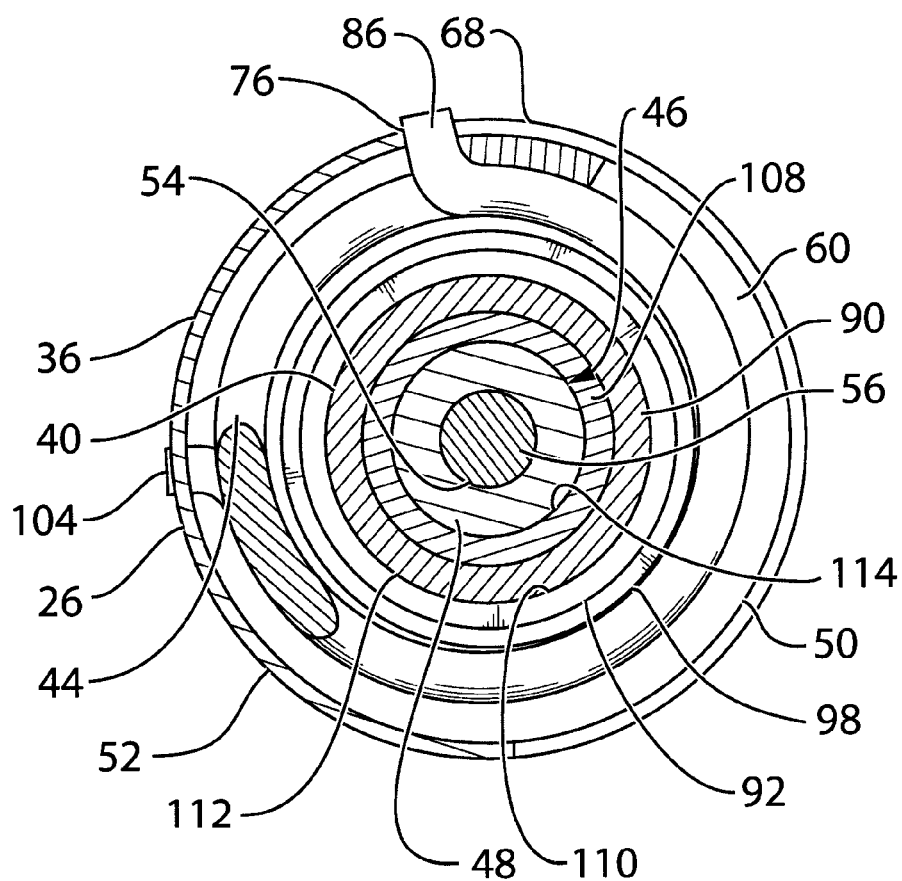
PRIOR ART     FIG.14

REAL ENGINE LAYOUT USED FOR THIS COMPARISON

| | X [mm] | Y [mm] | D [mm] | WRAP [DEG] | SPAM [mm] |
|---|---|---|---|---|---|
| 0 CRANKSHAFT | 0.00 | 0.00 | 20* | 178.54 | 199.41 |
| 1 IDLER | 50.00 | 200.00 | 50.00 | 20.79 | 153.92 |
| 2 INTAKE | 30.00 | 371.26 | 40* | 123.14 | 105.20 |
| 3 EXHAUST | -72.50 | 347.56 | 40* | 125.19 | 82.80 |
| 4 TENSIONER | -65.89 | 230.72 | 60.00 | 46.08 | 233.00 |
| TENSIONER BELT | -68.16 | 235.17 | *TEETH | | |

TENSIONER WITH INCREASED DAMPING

CROSS-REFERENCE TO RELATED APPLICATIONS

This application claims priority to U.S. Provisional Patent Application No. 61/716,894 filed Oct. 22, 2012 the contents of which are incorporated herein in their entirety.

FIELD

This disclosure relates to tensioners and in particular tensioners that operate to tension synchronous endless drive members such as a timing belt on an engine.

BACKGROUND

Tensioners are known devices for maintaining tension in belts (e.g. timing belts) or other endless drive members that are driven by an engine and that are used to drive certain components, such as camshafts. A tensioner typically includes a base that mounts to the engine, a tensioner arm that is pivotable with respect to the base about a pivot axis, a pulley that is mounted at a free end of the arm for engagement with the belt, and a spring that acts between the base and the arm to drive the arm into the belt. The direction into the belt (i.e. the direction in which the spring drives the arm) may be referred to as a direction towards a free arm position (i.e. towards a position that the tensioner arm would reach if no belt were present to stop it). This is a direction of lessening spring potential energy. The tensioner arm in general moves in this direction as the belt tension drops. The direction away from the belt (i.e. the direction against the biasing force of the spring) may be referred to as a direction towards a load stop position, and is a direction of increasing spring potential energy. The tensioner arm in general moves in this direction as the belt tension increases. It is known that it is desirable to provide damping on a tensioner in order to assist the tensioner arm in resisting being thrown off a belt during sudden increases in belt tension which can accelerate the tensioner arm suddenly towards the load stop position. In at least some demanding applications, however, the damping that is available from a typical prior art tensioner is not sufficient to satisfactorily inhibit such an event from happening. It would be desirable to provide a tensioner that has increased damping.

SUMMARY

In an aspect, a tensioner for an endless drive member, comprising a shaft and base that are mountable to be stationary relative to an engine, a tensioner arm that is pivotable relative to the shaft about a tensioner arm axis, a pulley on the tensioner arm rotatable about a pulley axis that is offset from the tensioner arm axis, and that is engageable with an endless drive member, a tensioner spring that is positioned to urge the tensioner arm towards a free arm position, a damping element that engages the tensioner arm and that is engaged by a plurality of axially spaced segments of the tensioner spring.

BRIEF DESCRIPTION OF THE DRAWINGS

FIG. 1 is a sectional side view of a prior art tensioner;
FIGS. 13 and 14 are sectional side and plan views of another prior art tensioner.

DETAILED DESCRIPTION OF EXAMPLE EMBODIMENTS

Figure 2A:
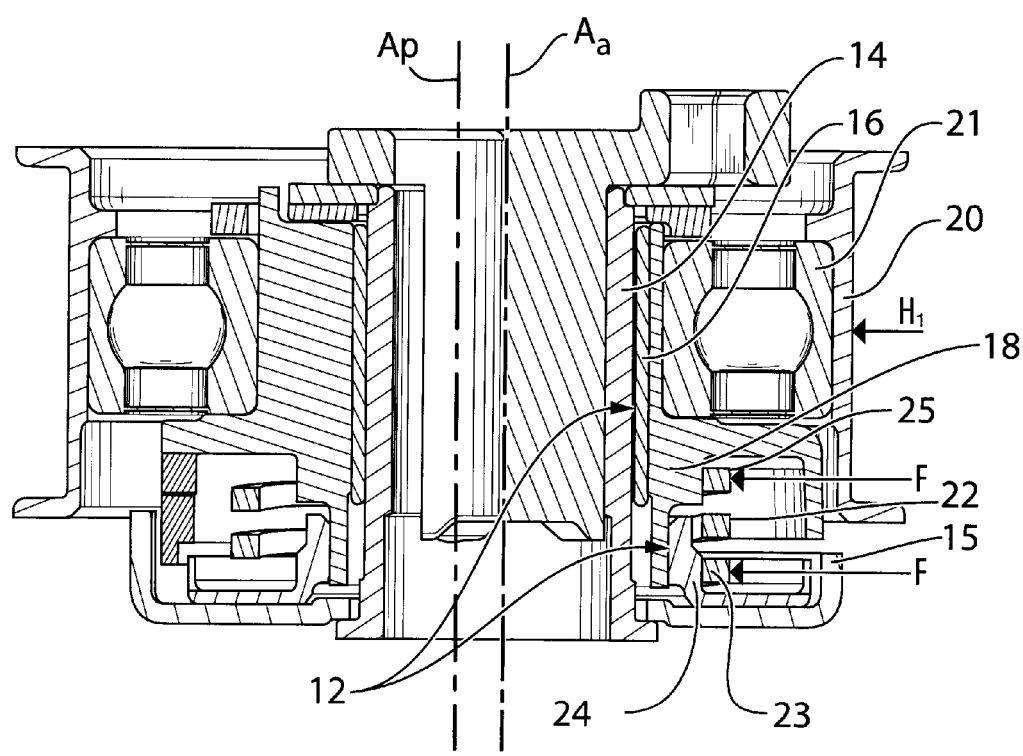
FIG. 2A is a sectional side view of another prior art tensioner.

A prior art tensioner is shown at 10 in FIG. 1, and includes a damping structure 12 that absorbs kinetic energy from a timing drive and converts the kinetic energy to heat through friction between components of the damping structure 12. The tensioner 10 includes a shaft 14, a base 15, a bushing 16, a tensioner arm 18, a pulley 20 that rotates on the arm 18 via a bearing 21 (e.g. a ball bearing) and a tensioner spring 22. The bushing 16 pivots with the tensioner arm about the shaft 14 during operation of the tensioner 10 in response to changes in tension of the endless drive member against which the pulley 20 is engaged. The endless drive member is not shown in FIG. 1, but it will be understood that it may be a timing belt or the like.

Figure 13:
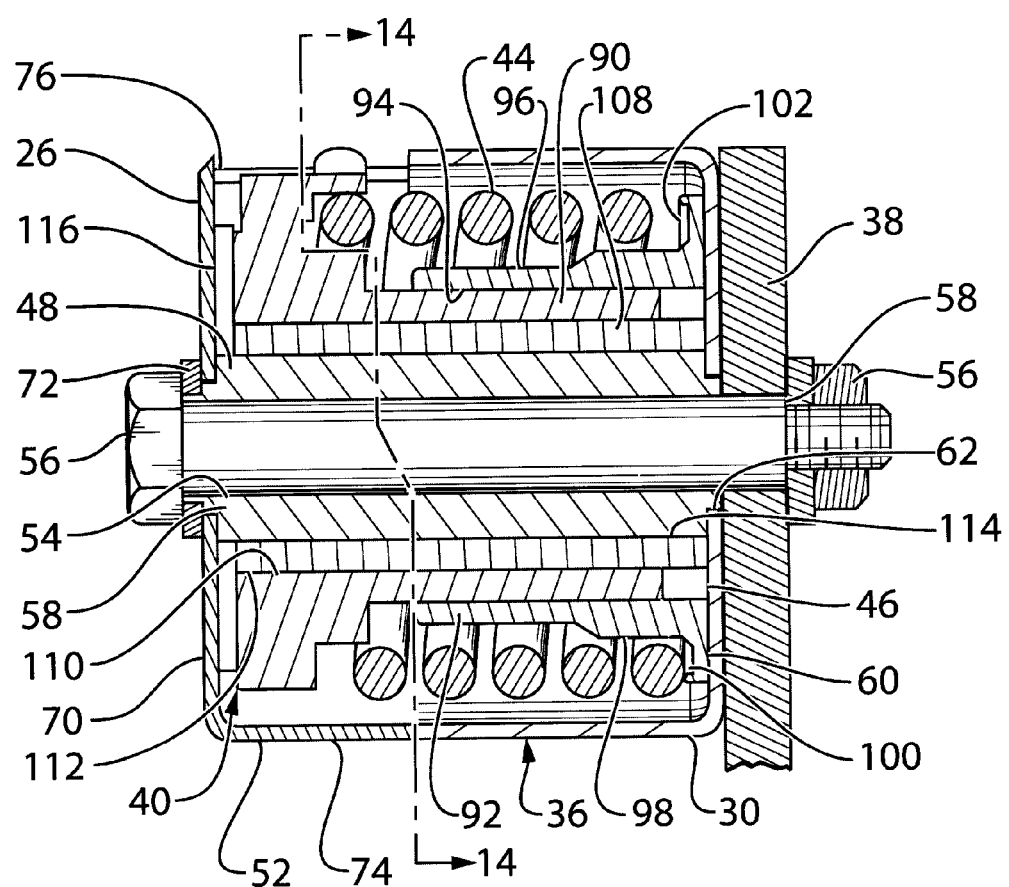

One source of friction is between the shaft 14 and the oscillating bushing 16 (which may be termed 'shaft-bushing friction'). In some applications the shaft-bushing friction is sufficient to control timing drive dynamics. However, sometimes more friction is required, as insufficient damping may lead to catastrophic failure of the belt and consequently catastrophic failure of the engine particularly in interference engine designs where the valves could collide with the pistons if the valve timing is incorrect. Referring to FIG. 2A, a spring support 24 is provided. The spring support 24 may in some instances be rotationally locked to the base 15 by a locking feature. Also, the axial force of the spring 22 against the spring support 24 can at least somewhat prevent rotation of the spring support 24 relative to the base 15 (i.e. a high frictional torque may exist between the spring support 24 and the base 15 which means that the spring support 24 is not 'fixed' to the base 15 but would not be expected to rotate under most operating conditions. The first coil of the spring 22 engages the spring support 24 and applies a force F on it radially inwardly towards the tensioner arm pivot axis $A_a$. An example of the spring support is shown in FIGS. 13 and 14, which are figures from U.S. Pat. No. 4,473,362, the contents of which are hereby incorporated by reference. It will be noted that FIGS. 13 and 14 are reproductions of figures from the aforementioned US patent including reference numerals used in that patent. Accordingly, the reference numerals in those two figures do not relate to items in this description. For example, item 112 as used in this description is not related to reference numeral 112 as it appears in FIGS. 13 and 14.

The spring support 24 may be made of nylon or any other suitable material. The compressive force F of the spring 22 on the spring support 24 urges the spring support 24 against the tensioner arm 18, which generates friction as the tensioner arm 18 pivots and slides against the spring support 24 during operation of the tensioner 10.

Figure 2B:
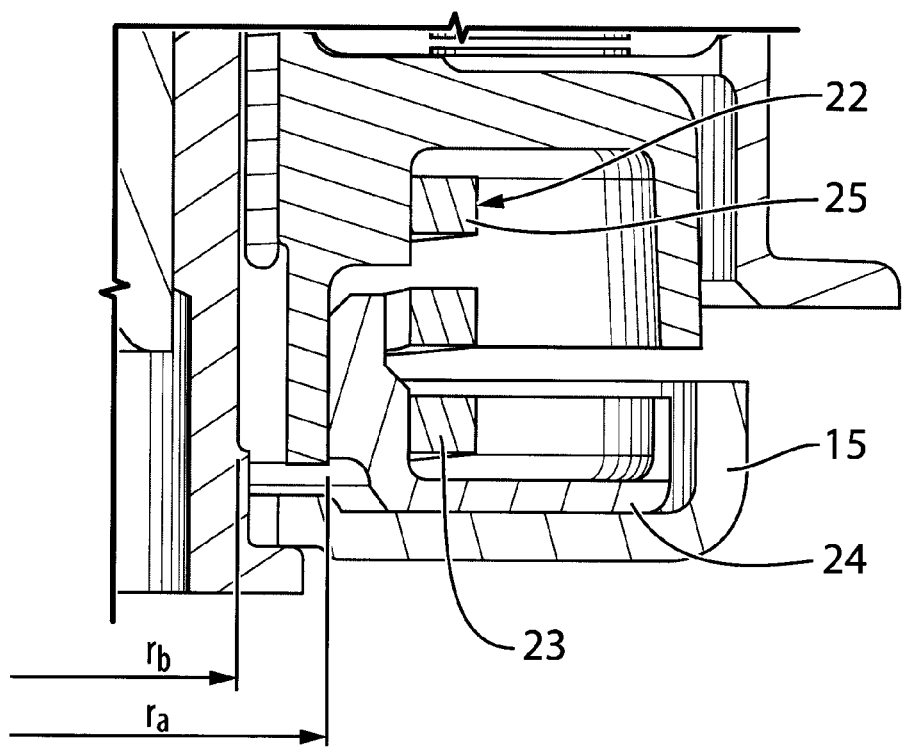
FIG. 2B is a magnified sectional side view of a portion of the tensioner shown in FIG. 2.

The spring 22 (which may be a torsion spring as shown) generates a torque T. The spring 22 has first and second ends 23 and 25 which end in tangs that are not shown in the sectional views in FIGS. 2A and 2B but which engage the base 15 and the arm 18 respectively. The first end 23 is hooked to the base 15 so as to be stationary relative to the engine, and is positioned at a distance $r_c$ from the spring centre. The second end 25 moves with the tensioner arm 18. Thus along the helical length of the spring 22, there is progressively more and more rotational oscillation movement starting from the stationary first end 23 along the length of the spring 22 to the oscillating second end 25. A force F acts on the first end 23 of the spring 22. This force is transmitted to the spring support 24. The friction coefficient between the engaged surfaces of the arm 18 and the spring support 24 is represented by $\mu_a$. The radius of the arm 18 at the region where the arm 18 contacts the spring support 24 is represented by $r_a$ as shown in FIG. 2B. The frictional torque generated by the spring support 24 is: $M_a=r_a*\mu_a*F$. Additionally, the compression of the spring support 24 in turn compresses the arm 18 by some amount, which in turn causes additional shaft-bushing friction. This additional frictional torque will be ignored for the purposes of this description. The shaft-bushing frictional torque (ignoring compressive effects from the spring support 24) may be calculated as: $M_b=r_b*\mu_b*H_1$, where $r_b$ is the bushing radius, $\mu_b$ is the friction coefficient between the engaged surfaces of the bushing 16 and the shaft 14, and $H_1$ is the hubload vector. In an example, where the tensioner 10 has a 3 mm arm (i.e. the offset between the pulley axis shown as $A_p$ and the tensioner arm axis $A_a$ is 3 mm), and assuming an angle between the tensioner arm 18 and the hubload vector of 90°, the frictional torque generated by the spring support 24 is approximately 100%*$M_a/M_b$=54% of the frictional torque generated by bushing (where $r_a$=12.5 mm, R=3 mm, $\mu_a$=0.2, $r_c$=20 mm, $r_b$=10 mm, $\mu_b$=0.07). Thus the frictional torque provided by the spring support 24 may be substantial, compared to the frictional torque provided by the engagement between the shaft 14 and bushing 16.

It would be advantageous to provide other sources of friction, aside from those described above in at least some situations. For example, in belt-in-oil applications the friction generated between the shaft 14 and bushing 16 is reduced due to lubrication caused by the presence of the oil. Thus an additional source or alternative source of friction is desirable. Also, in many applications it would be advantageous to be able to use a relatively longer tensioner arm (i.e. where R>3 mm). A longer tensioner arm may have better/larger take-up than a shorter arm, where 'take-up' is the amount of belt length the tensioner can compensate per one degree of rotation of the tensioner arm. Additionally, a longer arm permits more stable tension control. A longer arm may permit relatively easy pull-the-pin installation of the tensioner as compared to some tensioners which are complicated to install due to their use of an installation eccentric, which is an offset between the center of the shaft 14 and a pivot axis of the shaft 14 that is used to adjust the position of the shaft 14 during installation of the tensioner. Once the shaft 14 is correctly positioned, it is fixedly captured in its current position using a bolt or the like so that it does not pivot. Installation of such tensioners, however, can be complicated as noted above.

Long arm tensioners of the prior art, however, can sometimes generate too little frictional torque at the shaft-bushing interface precluding their use in some situations. In order to keep the bearings in the tensioner small (to keep costs down), an increase of the arm length can lead to a reduced shaft diameter, which in turn results in less frictional torque at the shaft-bushing interface. In an example, for a tensioner with a 30 mm inner diameter ball bearing, the ratio of the frictional torque to produced torque may be determined as follows: A 3 mm arm may be packaged with a 20 mm diameter shaft. It may have a 15 mm bearing radius−3 mm (arm eccentric)−1 mm (aluminum arm wall)−1 mm (bushing thickness)=10 mm (shaft radius). A 5 mm arm may only be packaged in the same bearing with 16 mm diameter shaft using a similar calculation as above. For a 3 mm arm, the damping ratio would be 10 mm (shaft radius)*0.1 (friction coefficient)*F (load)/3 mm (arm eccentric)*F=0.33. For a 5 mm arm, the damping ratio would be 8*0.1/5=0.16. With such a low damping ratio, the tensioner with a 5 mm arm would not be able to control timing drive dynamics in some cases. A damping ratio in the range of about 0.3 to about 0.4 may be suitable in some applications.

Figure 3:
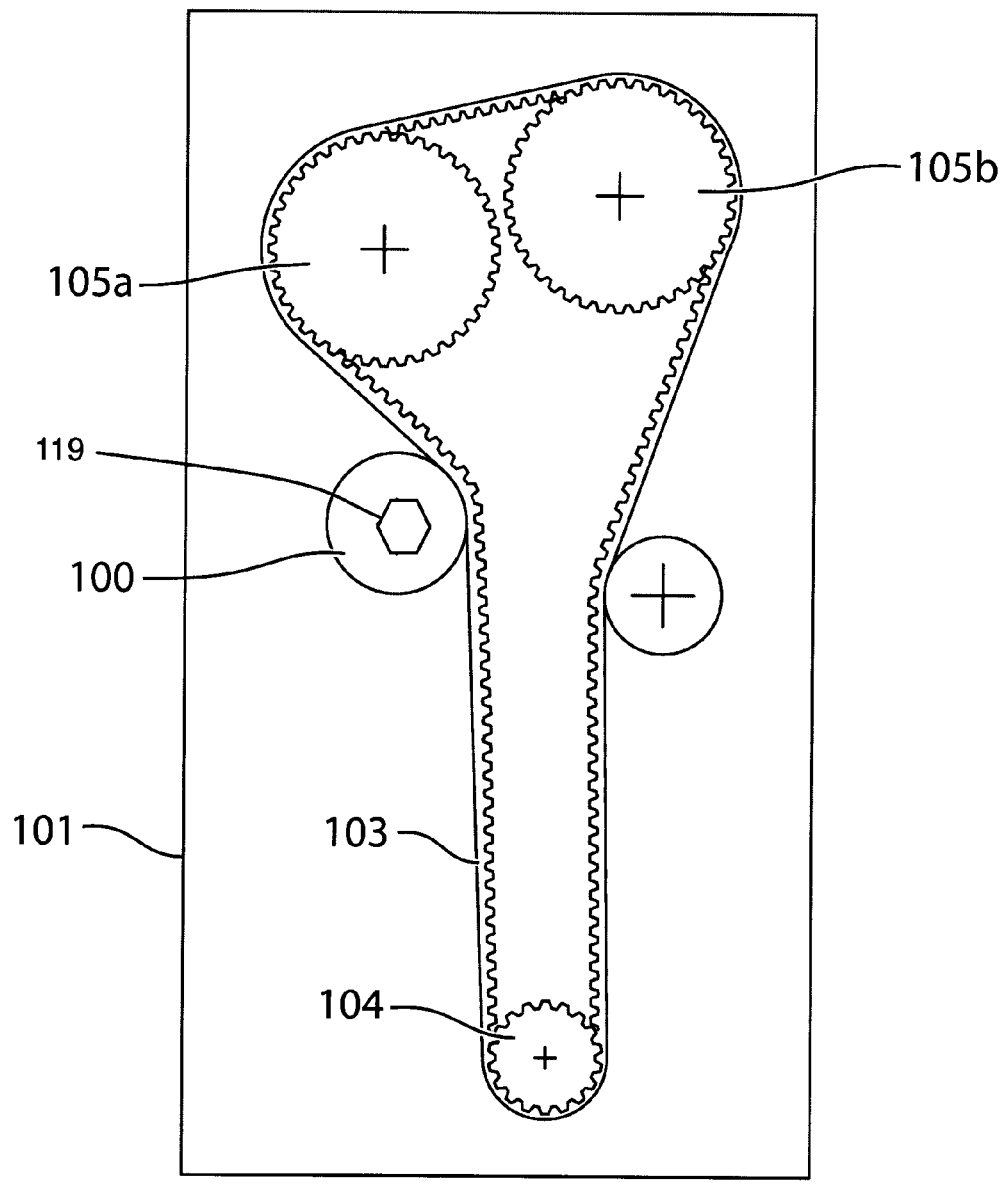
FIG. 3 is a side view of an engine with a tensioner in accordance with an embodiment of the present invention.

A tensioner 100 as shown mounted to an engine 101 in FIG. 3, which provides additional damping as compared to the tensioner shown in FIGS. 2A and 2B. The tensioner 100 acts on a timing belt 103 that transfers rotational power from a crankshaft 104 to a pair of camshafts 105a and 105b. The additional damping provided by the tensioner 100 is provided via a spring support as shown at 124 in FIG. 4. As a result, the tensioner 100 may have a tensioner arm length of more than 3 mm (e.g. 5 mm) in some instances. The tensioner 100 has a shaft 114 that may be similar to the shaft 14, a base 115 that is staked to one end of the shaft 114, a bushing 116 that may be similar to bushing 16, a tensioner arm 118 that may be similar to the tensioner arm 18, a pulley 120 that may be similar to the pulley 20, a bearing 121 that may be similar to the bearing 21, and a tensioner spring 122 that may be similar to the spring 22.

Figure 4:
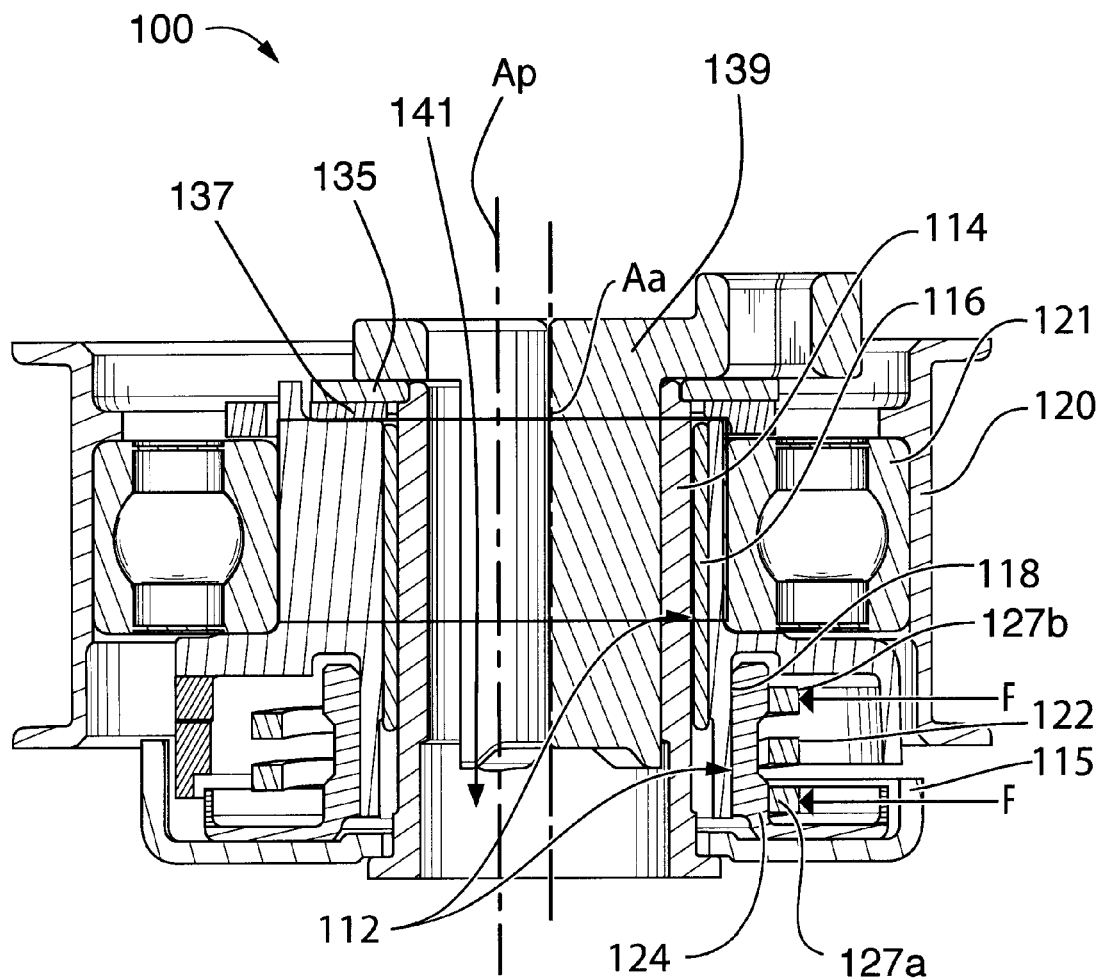
FIG. 4 is a sectional side view of the tensioner shown in FIG. 3.

The tensioner arm 118 is pivotable about a tensioner arm pivot axis Aa shown in FIG. 4. The pulley 120 is rotatable about a pulley axis Ap, which is offset from the tensioner arm pivot axis Aa, wherein the amount of offset is the length of the tensioner arm.

A retaining washer 135 is staked to the other end of the shaft 114 to hold selected components together. A polymeric bushing plate 137 is provided between the retaining washer 135 and the tensioner arm 118 to prevent metal-to-metal contact therebetween. The bushing 116 and the damping element 124 may together be generally referred to as a damping system 112.

In the embodiment shown in FIG. 4 an installation eccentric 139 is provided in an aperture 141 in the shaft 114, which permits adjustment of position of the tensioner arm 118 during installation of the tensioner 100 on an engine. A fastener shown at 119 in FIG. 3, passes through the aperture 141 (FIG. 4) but is offset from the center of aperture 141 by the installation eccentric 139 to mount the tensioner 100 to the engine. However, in a preferred variant shown in FIGS. 4B and 4B, there is no installation eccentric, and a longer tensioner arm length 118 can be provided (e.g. 5 mm as opposed to 3 mm). In this variant, a fastener (not shown) passes through the aperture 141 (and is centered therein), to mount the tensioner 100 to the engine. The variant shown in FIGS. 4A and 4B may otherwise be similar to the embodiment shown in FIG. 4.

Figure 6:
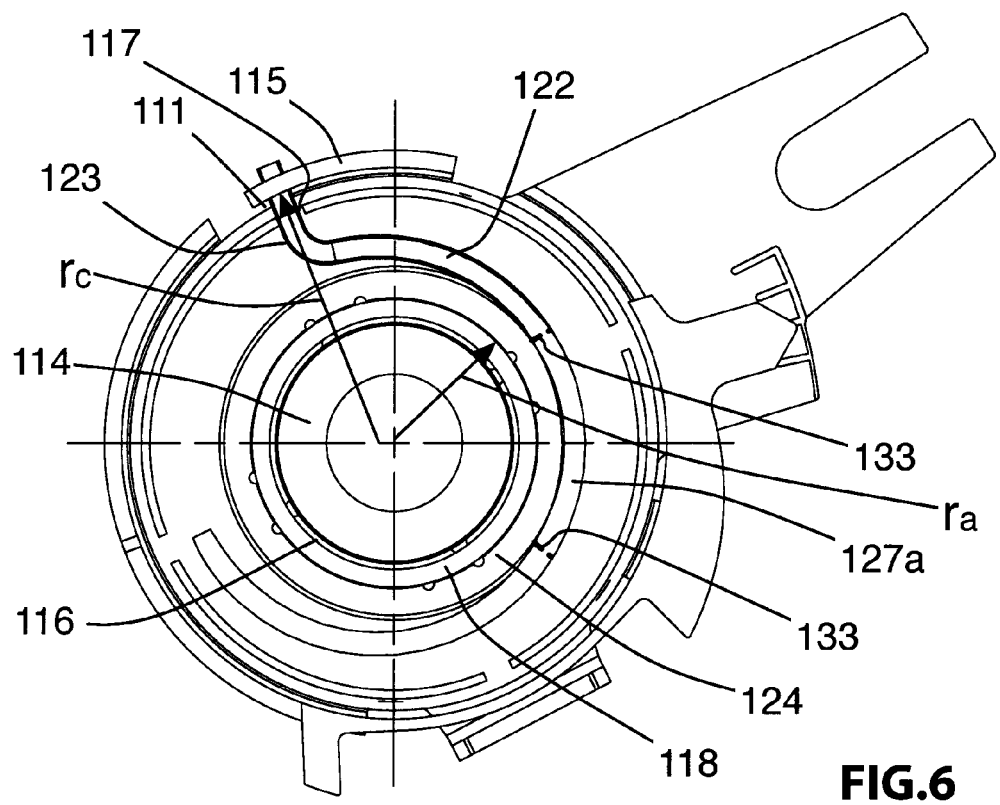
FIG. 6 is a sectional view of a 'bottom' or 'proximal' portion of the tensioner shown in FIG. 4, that contacts the engine.
Figure 7:
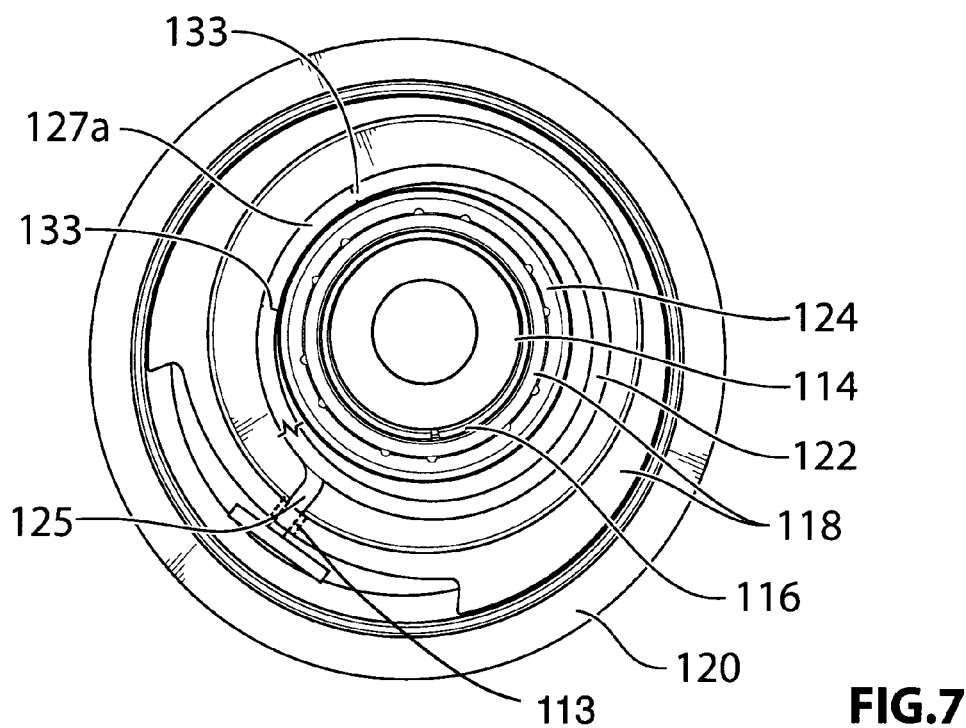
FIG. 7 is a sectional view of an 'upper' or 'distal' portion of the tensioner shown in FIG. 4.
Figure 8:
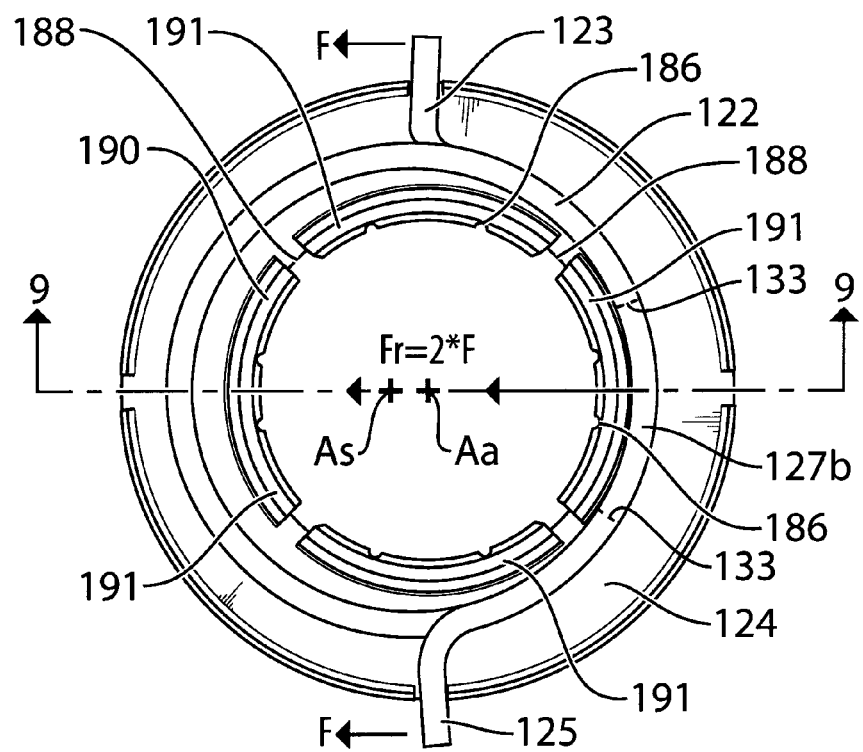
FIG. 8 is a plan view of a spring and a damping element from the tensioner shown in FIG. 4.
Figure 8A:
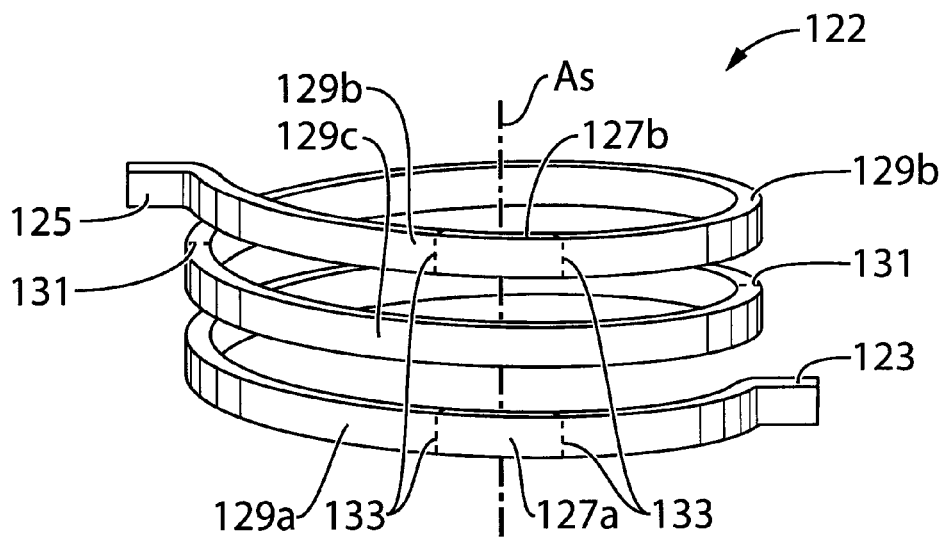
FIG. 8A is a perspective view of the spring from the tensioner shown in FIG. 4.
Figure 9:
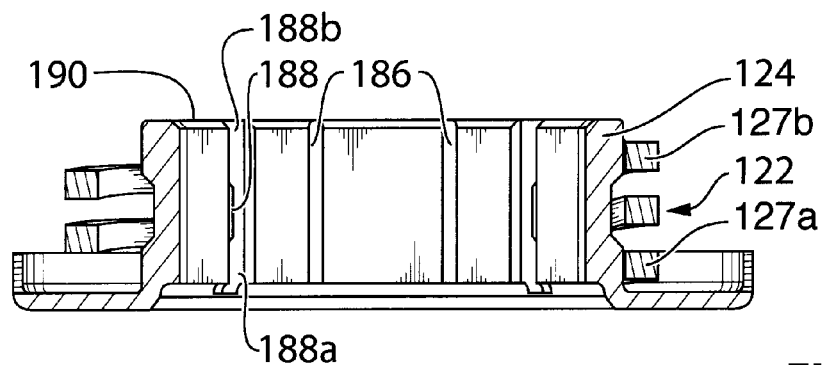
FIG. 9 is a sectional side view of the spring and the damping element shown in FIG. 8.

FIG. 6 is a sectional view of a 'bottom' or 'proximal' portion of the tensioner 100 that contacts the engine. FIG. 7 is a sectional view of an 'upper' or 'distal' portion of the tensioner 100. FIG. 8 is a plan view of the spring 122 and the damping element 124. FIG. 8A is a perspective view of the spring 122 alone. FIG. 9 is a sectional side view of the spring 122 and the damping element 124.

Figure 4A:
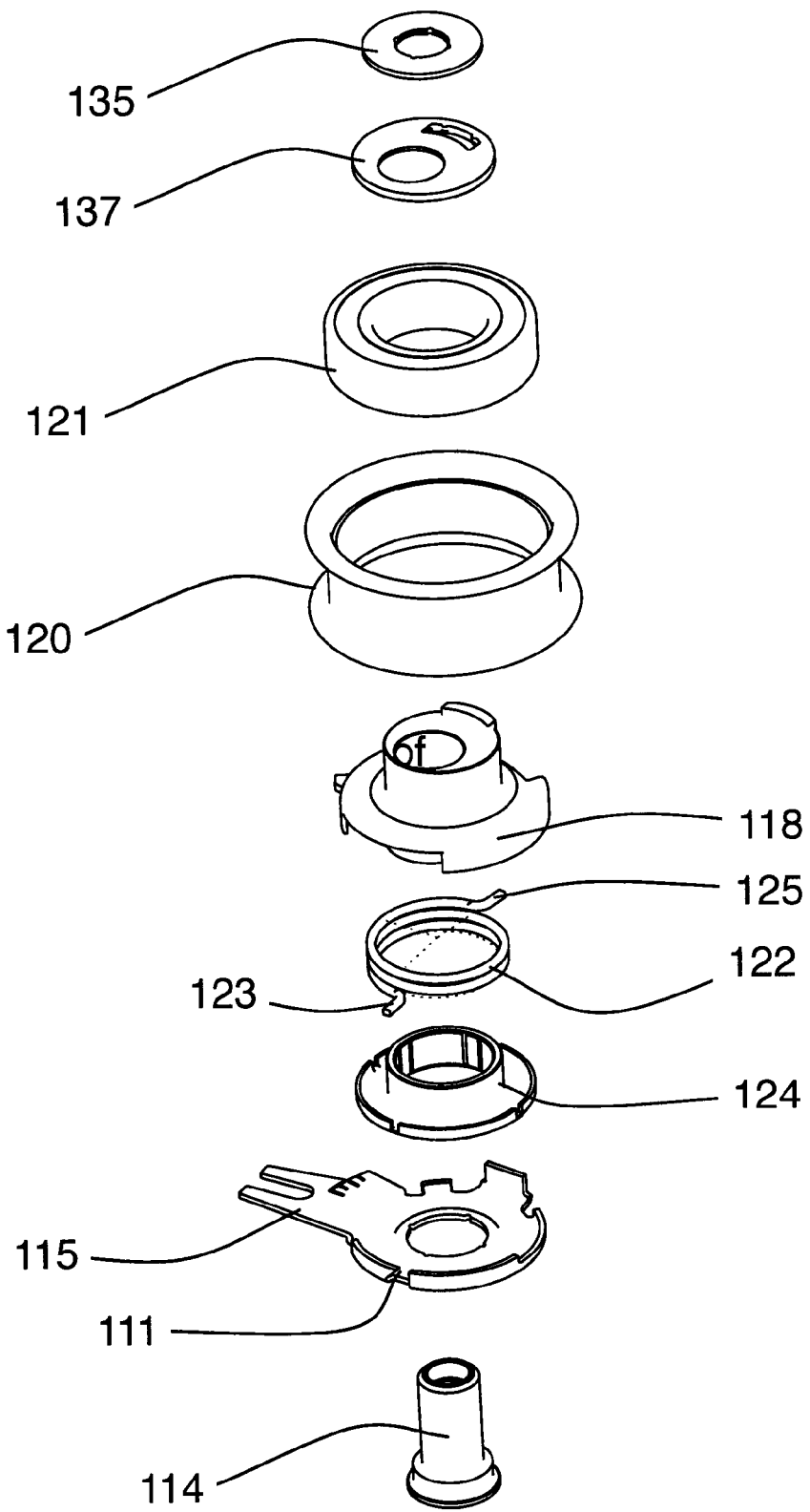
FIGS. 4A and 4B are exploded perspective views of a variant of the tensioner shown in FIG. 4.
Figure 4B:
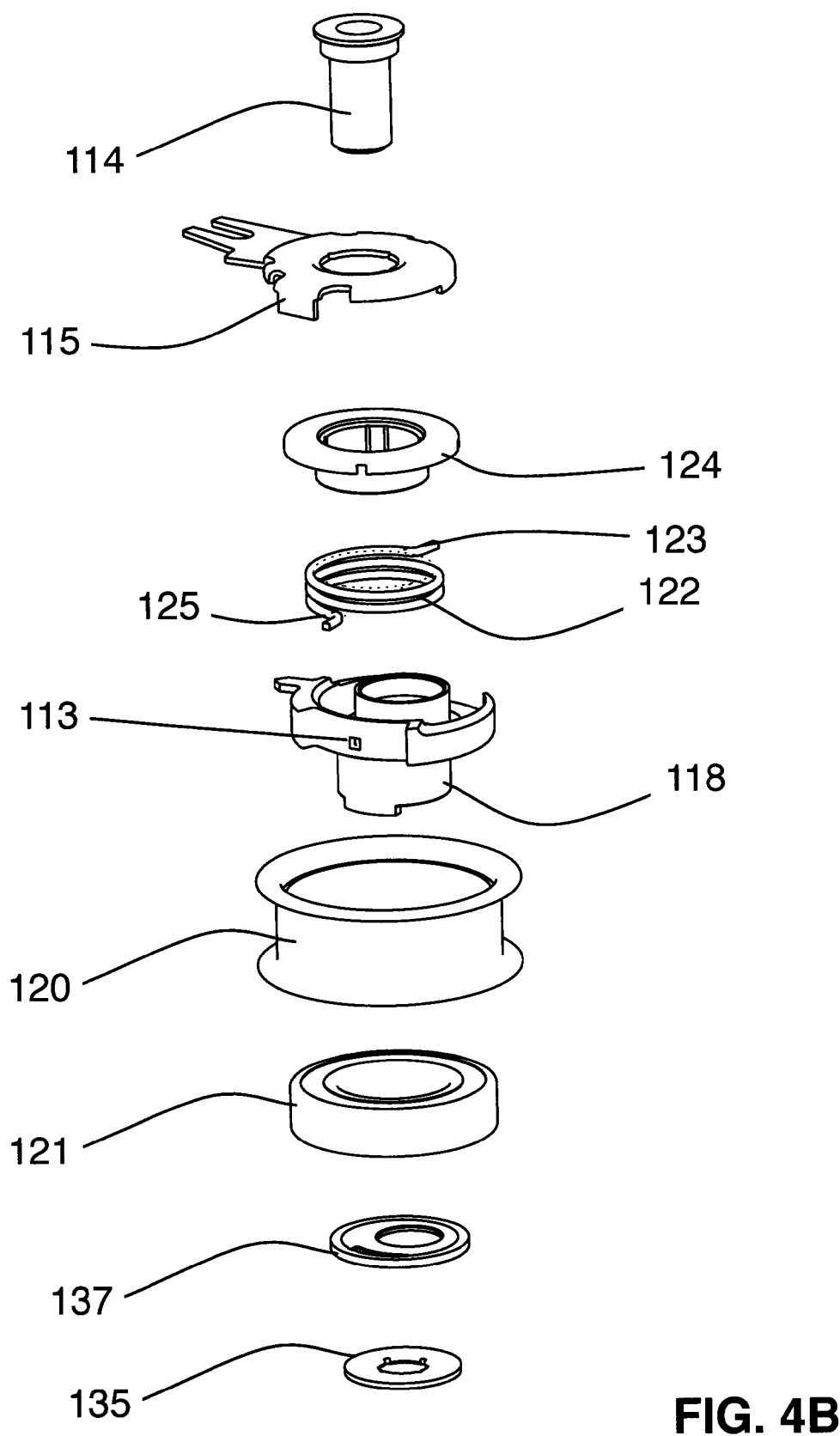

As shown in FIGS. 8 and 8A, the tensioner spring 122 has a first end 123 and a second end 125, each of which ends in a tang. As shown in FIGS. 4A and 6, the tang at the first end 123 engages the base 115 (more particularly it engages a slot 111 in the base 115) so as to anchor the first end 123 of the spring 122. Additionally, as shown in FIG. 7 the tang at the first end 123 passes through a slot 117 in the damping element 124, which rotationally fixes the damping element 124 to the base 115, while still permitting the damping element 124 to slide as needed to engage the tensioner arm 118. As shown in FIGS. 4B and 7 the tang at the second end 125 engages the tensioner arm 118 (more particularly it engages a slot 113 in the tensioner arm 118) so as to apply a biasing force urging the tensioner arm 118 into the belt 103. Referring to FIG. 8A, the spring 122 may be a helical torsion spring that includes more than one coil wherein a coil is defined as a segment of the spring 122 that extends through 360 degrees. In this embodiment the spring 122 has 2.5 coils including a first end coil 129a, a second end coil 129b, and a 180 degree segment shown at 129c between the first and second end coils 129a and 129b. Delimiters between the coils 129a, 129b and the segment 129c are shown at 131.

Referring to FIGS. 8, 8A and 9, the spring support 124 may be similar to the spring support 24, however, in the tensioner 100, the spring support 124 is configured such that a first segment 127a in the first end coil 129a and a second segment 127b in the second end coil 129b both engage the spring support 124. The segments 127a and 127b are shown in a perspective view in FIG. 8A. In FIG. 6, only a portion of the spring 122 is shown so that the segment 127a is not obstructed. In FIG. 7, a different portion of the spring 122 is shown so that the segment 127b can be seen unobstructed. As can be seen in FIGS. 6, 7 and 8A, delimiters shown at 133 show the extents of the segments 127a and 127b (i.e. they show the ends of the portions of the spring 122 that contact the spring support 124). As can be seen, the first segment 127a and the second segment 127b are axially offset or spaced from one another, and are in the first end coil 129a and second end 129b, respectively. Also, as can be seen in FIG. 8A, the first and second segments 127a and 127b are generally aligned axially.

Figure 17:
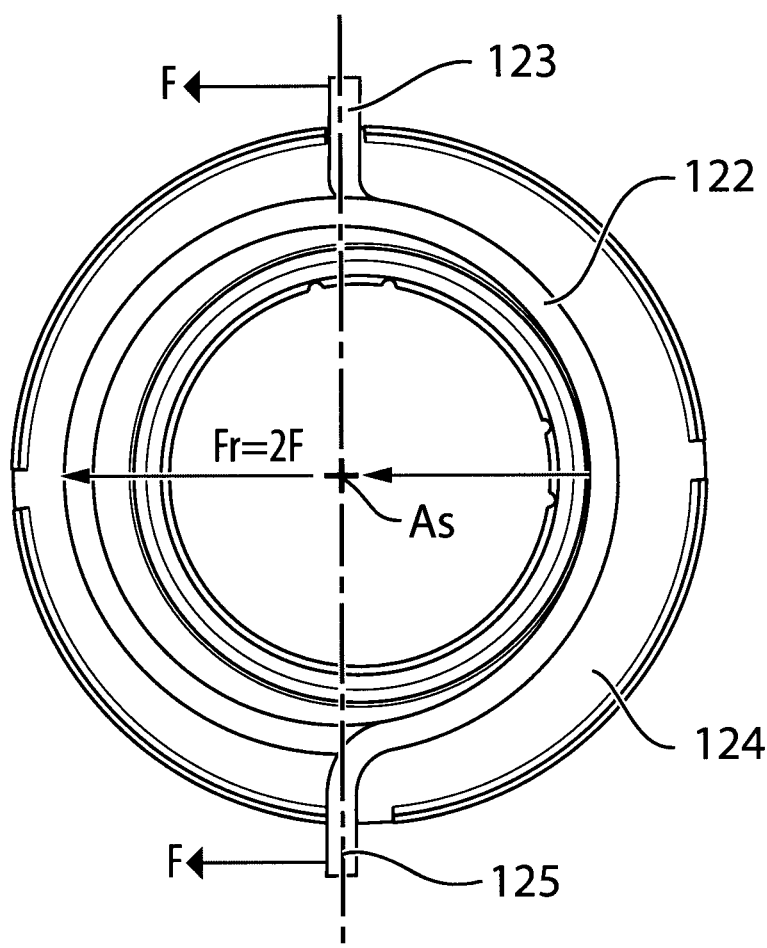
FIGS. 17-19 are plan views of the spring and the damping element, with different relative angles between two ends of the spring.
Figure 18:
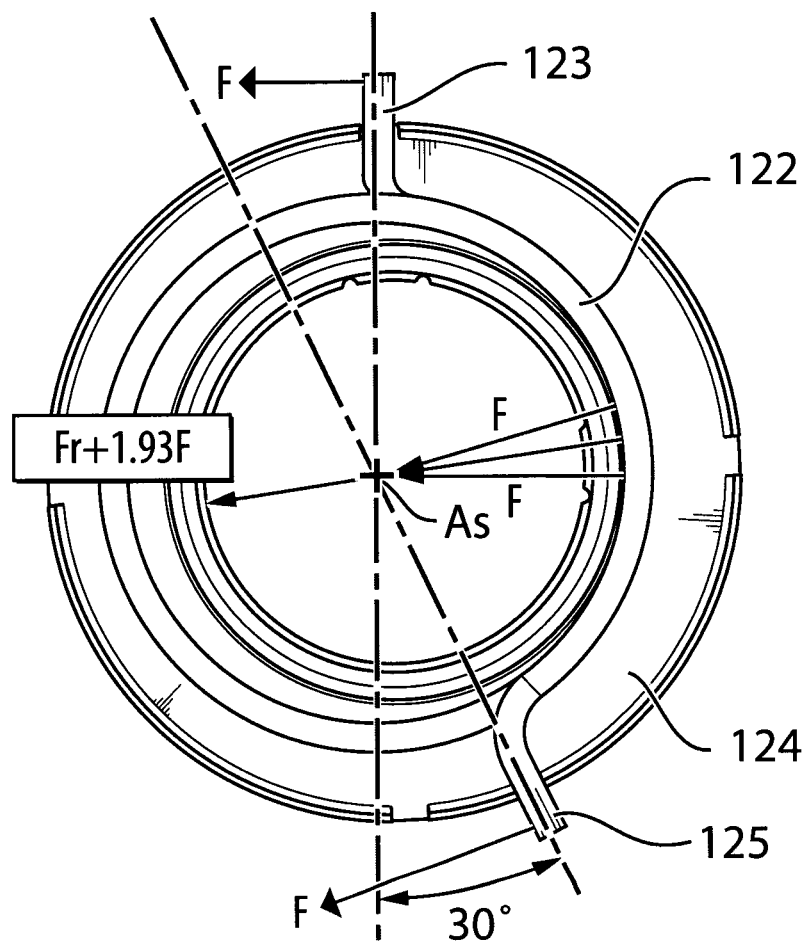
Figure 19:
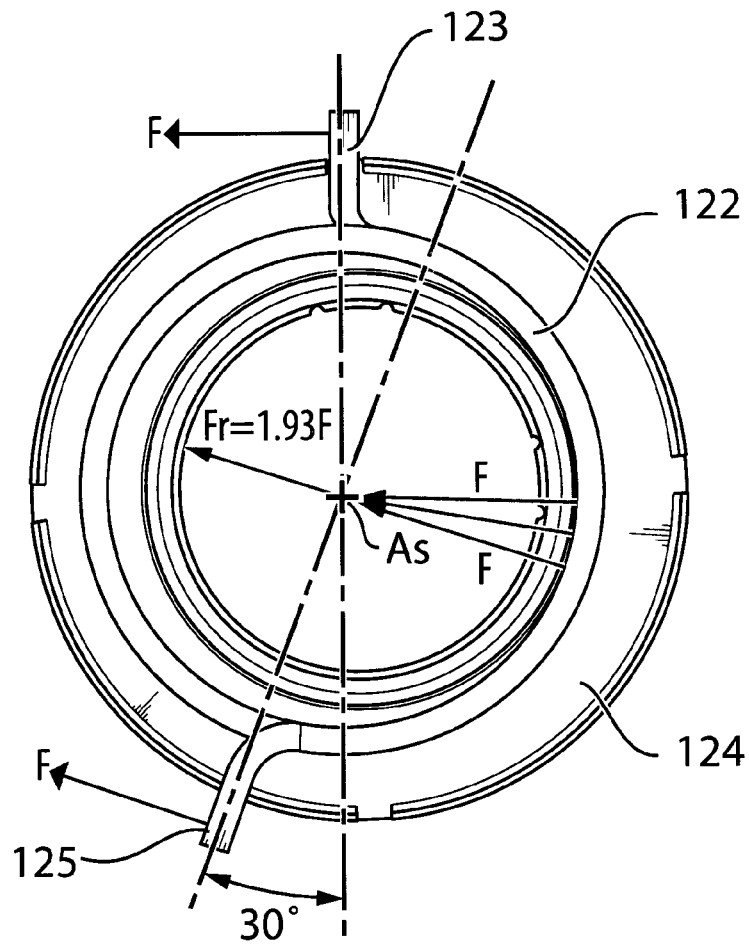
Figure 20:
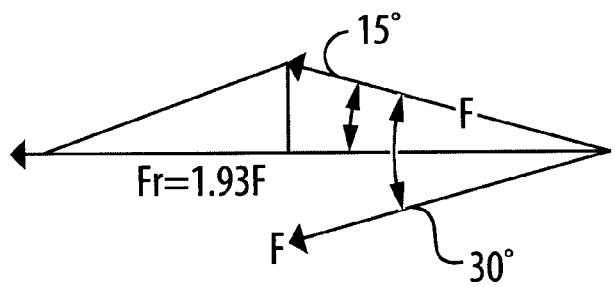
FIG. 20 is a diagram illustrating the vector sum of the forces acting on the ends of the spring in either of FIGS. 18 and 19.

As shown in FIG. 8, the overall force exerted on the spring support 124 by the spring 122 is F at the first end 123 and F at the second end 125. As a result, the overall frictional torque (and therefore damping) generated by the spring support 124 and the arm 118 is greater than (i.e. approximately double) that produced in the embodiment shown in FIGS. 2A and 2B (and the embodiment shown in FIG. 1). This is based on the assumption that the force F that is exerted at the two ends 123 and 125 of the spring 122 are approximately in the same direction, which is true when the spring ends 123 and 125 are approximately 180 degrees apart angularly about the spring axis, shown at As (FIG. 8). Their relative positions are shown in an example in FIG. 8. Their ranges of relative positions during use over a range of belt tensions are shown in FIGS. 17-19. When they are 180 degrees apart, the forces are aligned and are purely additive. When they are at some other angle relative to each other, the forces are not purely additive and vector components of the forces must be considered to determine the overall force exerted on the spring support 124.

As noted above the second spring end 125 oscillates together with the tensioner arm 118. Thus, there is friction generated between second spring end 125 and the stationary spring support 124, and consequently there is the potential for wear on the spring support 124. In a belt-in-oil application this wear may be acceptable. In applications where the wire used for the spring 122 has a square cross-sectional shape, the pressure of the spring 122 on the spring support 124 is lower than the pressure exerted by a spring 122 round cross-section (since there is more contact area on the square cross-section spring). Thus in embodiments where a square (or rectangular) cross-section spring 122 is used, such as is shown in FIG. 4, the wear may be acceptable. The wear may also be acceptable even in embodiments that include a round cross-section spring 122.

Based on the above, it can be seen that, as compared to the embodiment shown in FIGS. 2A and 2B, the frictional torque generated using the embodiment shown in FIG. 4 is as follows: approximately twice the frictional torque generated by the spring support 24, a limitedly higher frictional torque that is generated between the shaft 14 and bushing 16, and additional friction generated between the second end 125 of the spring 122 and the spring support 124, which has no analogous arrangement in the embodiment in FIGS. 2A and 2B. The additional damping provided by the embodiment shown in FIG. 4 may permit the use of a longer arm tensioner than is possible with the embodiment shown in FIGS. 2A and 2B. It may also permit the tensioner 100 to be used in a belt-in-oil application, in either a short-arm or long-arm configuration. The spring support 124 may be referred to as a damping element or a damper due to its increase role in the damping.

It will be noted that, while the spring 122 constricts during operation and applies a compressive force on the damping element 124 it may push oil away (in a helical direction—along the length of the spring coils) from the contact area between the spring 122 and the damping element 124. As a result, the presence of oil may not cause a large reduction in friction between the spring 122 and the damping element 124. It will also be noted that, while the spring 122 may be made from a spring wire having a square or rectangular cross-section, the wire may twist by some angle during operation and thus may engage the damping element at some points along a corner of the cross-sectional shape and not along a flat face of the cross-sectional shape. This will reduce by some amount lubricating effects of any oil that is present that would reduce the friction between the spring 122 and the damping element 124.

Figure 5:
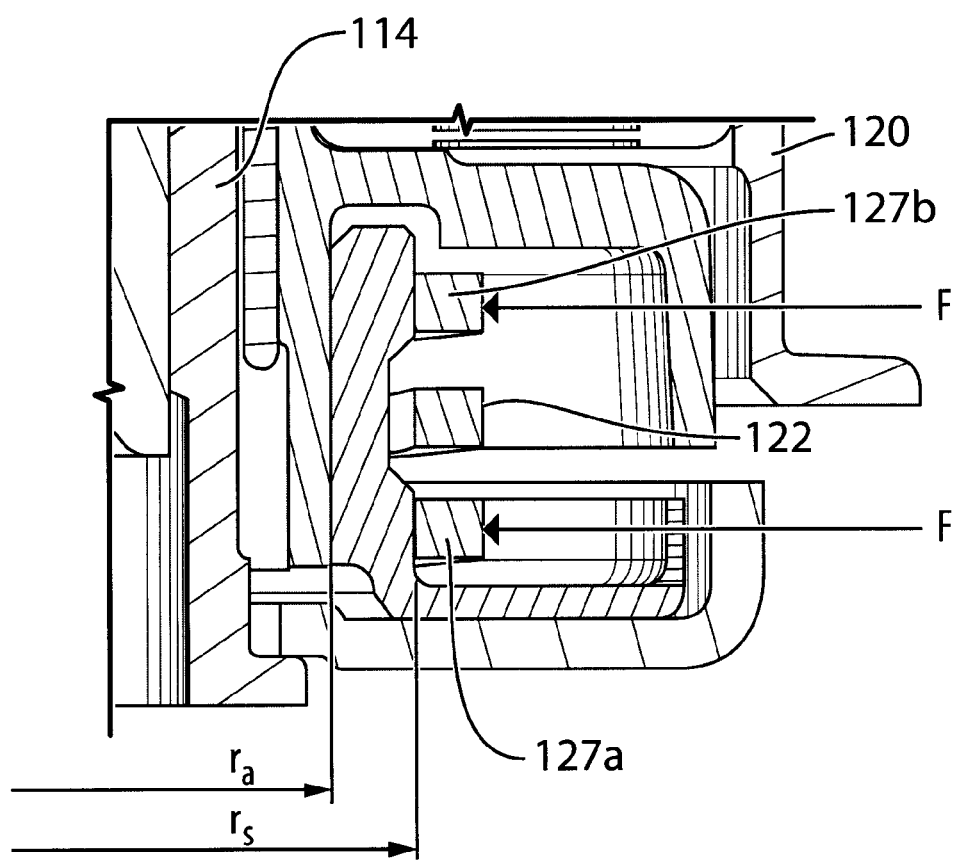
FIG. 5 is a magnified sectional side view of a portion of the tensioner shown in FIG. 4.
Figure 10:
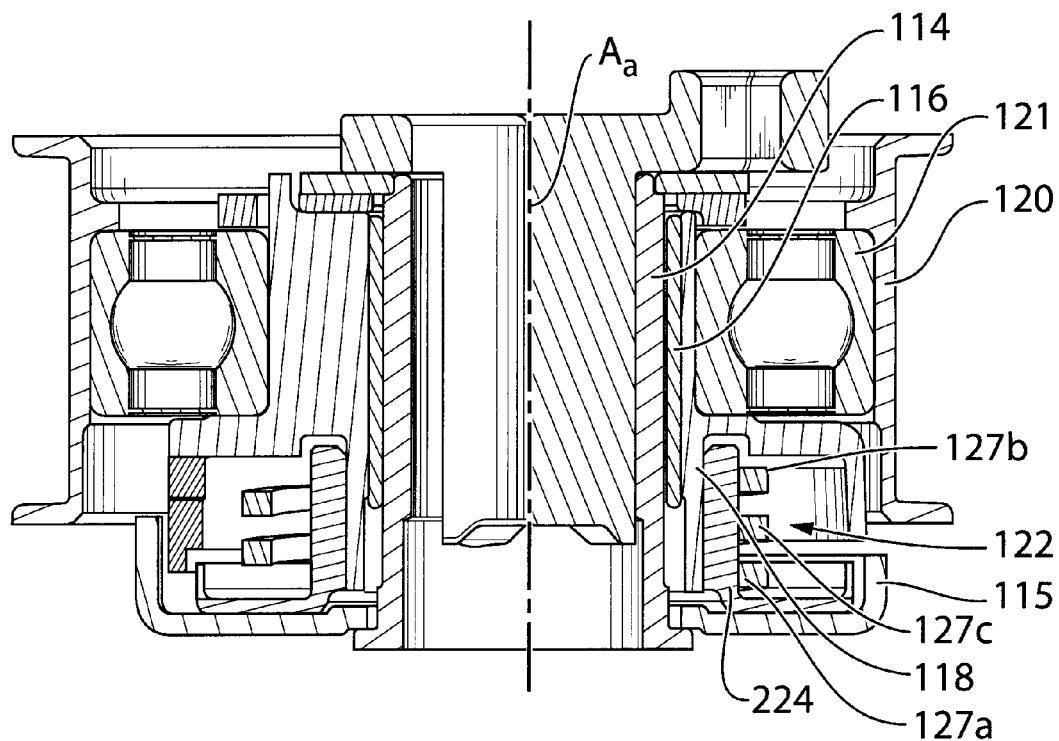
FIG. 10 is a sectional side view of a tensioner in accordance with another embodiment of the present invention.
Figure 11:
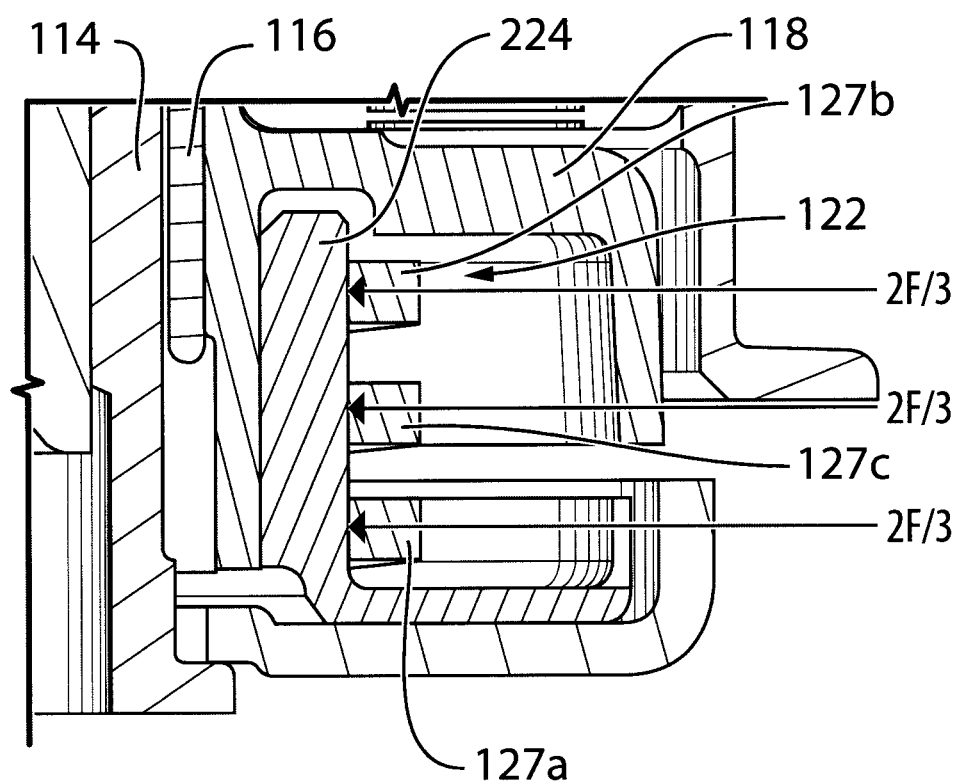
FIG. 11 is a magnified sectional side view of a portion of the tensioner shown in FIG. 10.

As shown in FIGS. 10 and 11, instead of only engaging the damping element 124 with segments 127*a* and 127*b* in the first and second end coils 129*a* and 129*b* of the spring 122 as shown in FIGS. 4 and 5, it is alternatively possible to provide an embodiment where at least one additional spring segment engages the damping element 124. For example, in the embodiment shown in FIGS. 10 and 11, the segment shown at 127*c*, which is axially between the first and segments 127*a* and 127*b*, also engages the damping element 124. The overall force exerted by the spring 122 remains as being 2F, (based on the force F that is applied to the spring 122 at both ends 123 and 125 as shown in FIGS. 8 and 9), but because there are three spring segments that contact the damping element 124, the force exerted on the damping element 124 by each of the three spring segments 127*a*, 127*b* and 127*c*, is 2F/3, as shown in FIGS. 10 and 11. As a result, there is a reduced pressure applied by each coil on the damping element 124 as compared to the embodiment shown in FIGS. 4 and 5. Consequently there may be less wear on the damping element 124. If more than three axially spaced segments are in contact with the damping element 124, the force applied by each coil may be reduced further, thereby reducing the pressure on the damping element while maintaining the overall force (i.e. 2F).

Figure 12:
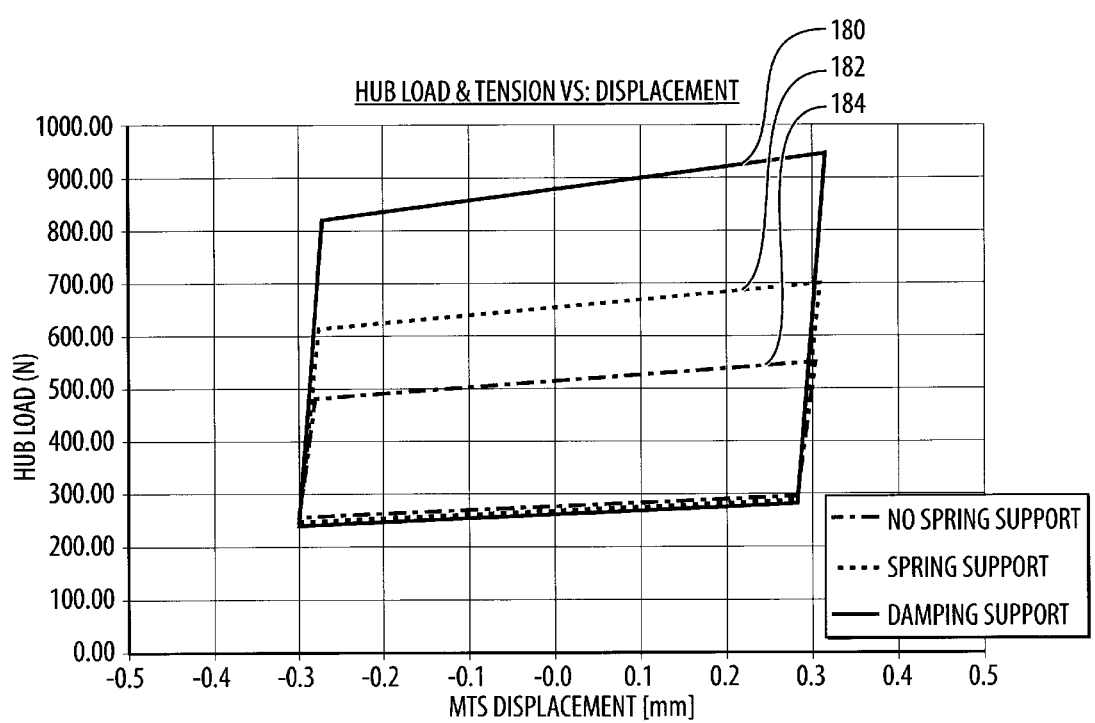
FIG. 12 is a graph illustrating the hub load on the pulley from the tensioners shown in FIG. 1, FIG. 2 and FIG. 4.

As noted above, all along the helical length of the spring 122, the magnitude of the oscillatory movement increases progressively along the helical length of the spring 122 from the stationary first end 123 to the second end 125 which oscillates with the arm 118. Thus each segment 127*a*, 127*c*, 127*b* has progressively more sliding movement with the damping element 124. While the first segment 127*a* has some non-zero amount of sliding movement with the damping element 124 it is relatively small and may be ignored for its impact on the overall damping provided by the tensioner 100. In an example if there are three segments 127*a*, 127*b*, and 127*c* and the tensioner arm 118 (and therefore the second end 125) oscillates with an amplitude of ±6 degrees, then the third segment 127*c* would oscillate with an amplitude of about ±3 degrees, and the first segment 127*a* would substantially not oscillate). In the embodiment shown in FIGS. 10 and 11, the frictional torque provided by the damping element 124 may be about 2.5 times the frictional torque provided by the spring support 24 of the tensioner 10 shown in FIGS. 2A and 2B. This increase in frictional torque (and therefore damping) is provided at essentially no added cost or complexity and without adding new components. The performance of the tensioner 100 relative to the tensioner 10 is shown in FIG. 12, which shows hysteresis curves for the tensioner 100 at 180, the tensioner 10 with a spring support at 182 and the tensioner 10 with no damping element (as shown in FIG. 1) at 184.

In applications where the friction surfaces will be exposed to oil, features may be provided to assist in removing oil from them so as to reduce the risk of sudden drops in friction and damping that can occur from the presence of oil. Slits (which may be referred to as channels or grooves) shown at 186 in FIG. 9 in the damping element 124 are designed to provide oil reservoirs or transport channels to help to transfer oil out from contacting surfaces between the damping element 124 and the arm 118 (not shown in FIG. 9). The channels 186 may be provided with sharp edges which can scrape oil from the surface of the arm 118 to reduce the risk of development of an oil film between the contacting surfaces of the damping element 124 and the arm 118. The presence of the channels 186 reduces the overall contact area between the damping element 124 and the arm 118, which increases the surface pressure between them. The size and/or number of the channels 186 can be selected to provide a selected surface pressure that may be high enough to squeeze oil out from between the contacting surfaces.

Another feature that may be provided on the damping element 124 may be reductions in wall thickness 188, which may be referred to as flex joints 188. The flex joints 188 increase the flexibility of the damping element wall (shown in FIG. 9 at 190) which increases the contact area between the wall 190 and the tensioner arm 118 which in turn makes for less wear and more stable friction between them. These flex joints 188 can be provided any suitable way. For example, the flex joints 188 may extend axially along the axial length of the damping element wall 190. They may, in some embodiments, be provided on the face of the wall 190 that faces the arm 118. In the embodiment shown in FIGS. 8 and 9, it can be seen that the flex joints 188 are formed by slots that pass through the entirety of the wall thickness and which extend substantially along the entire axial length of the damping element 124 and which are closed at a first end 188*a* and open at a second end 188*b*. As can be seen in FIG. 8 in particular, these slots separate a portion of the damping element 124 into segments shown at 191.

In other embodiments, the wall thickness at these flex joints 188 may be about half of the wall thickness elsewhere, or it may be a different non-zero fraction of the wall thickness away from the flex joints 188.

Figure 15A:
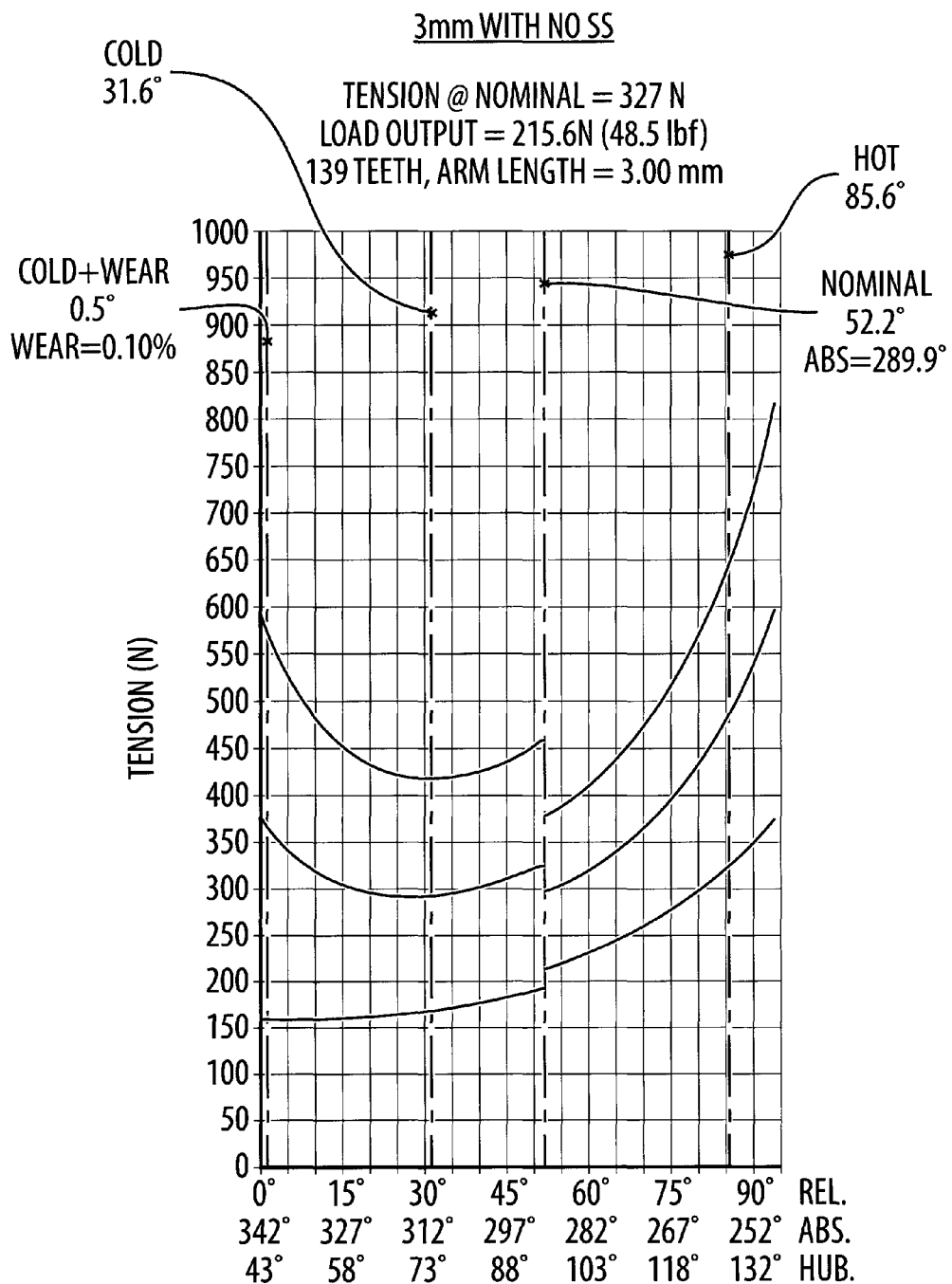
FIG. 15A-15G are graphs illustrating the belt tension in relation to the arm position of several different tensioner configurations.
Figure 15B:
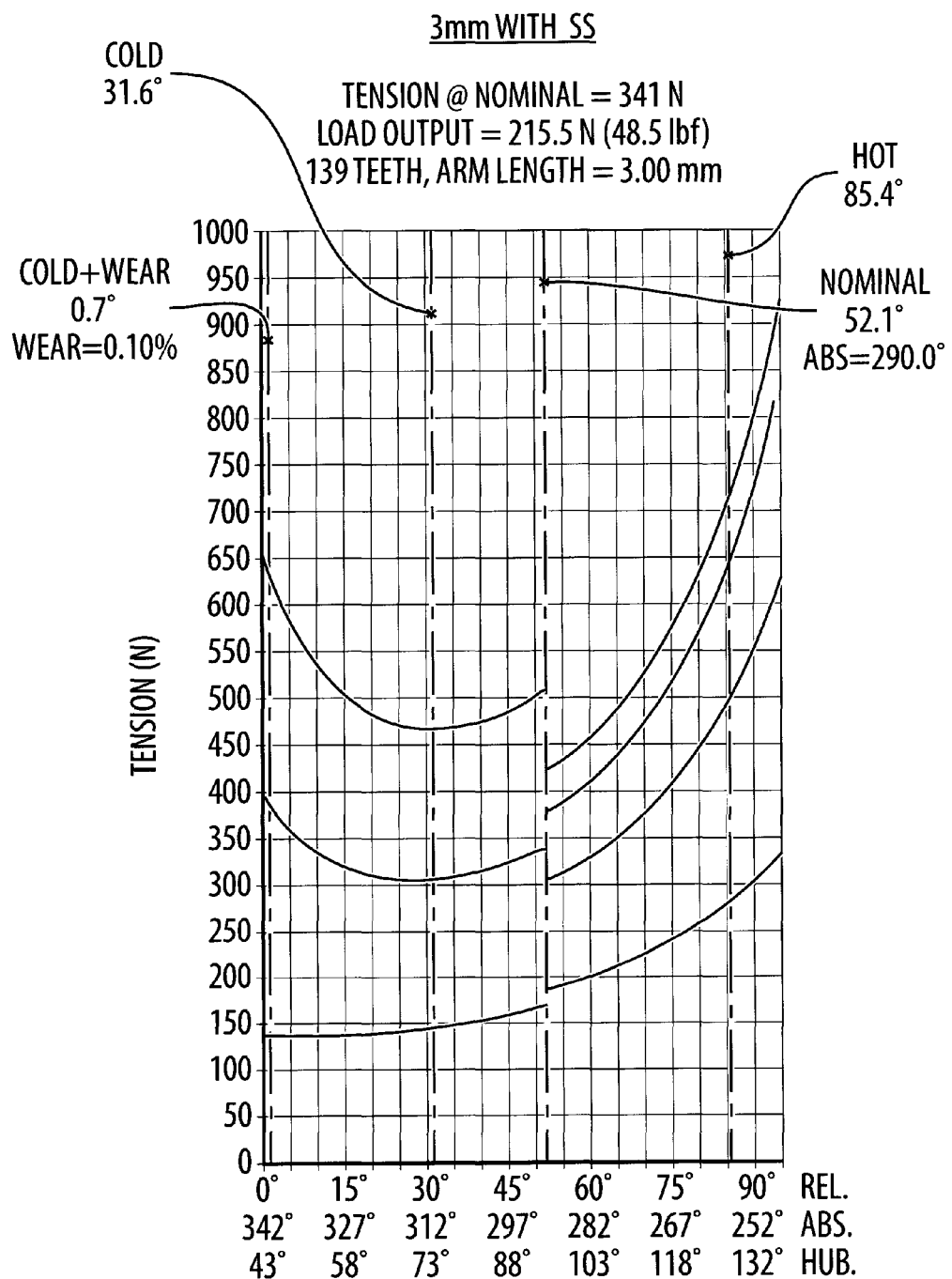
Figure 15C:
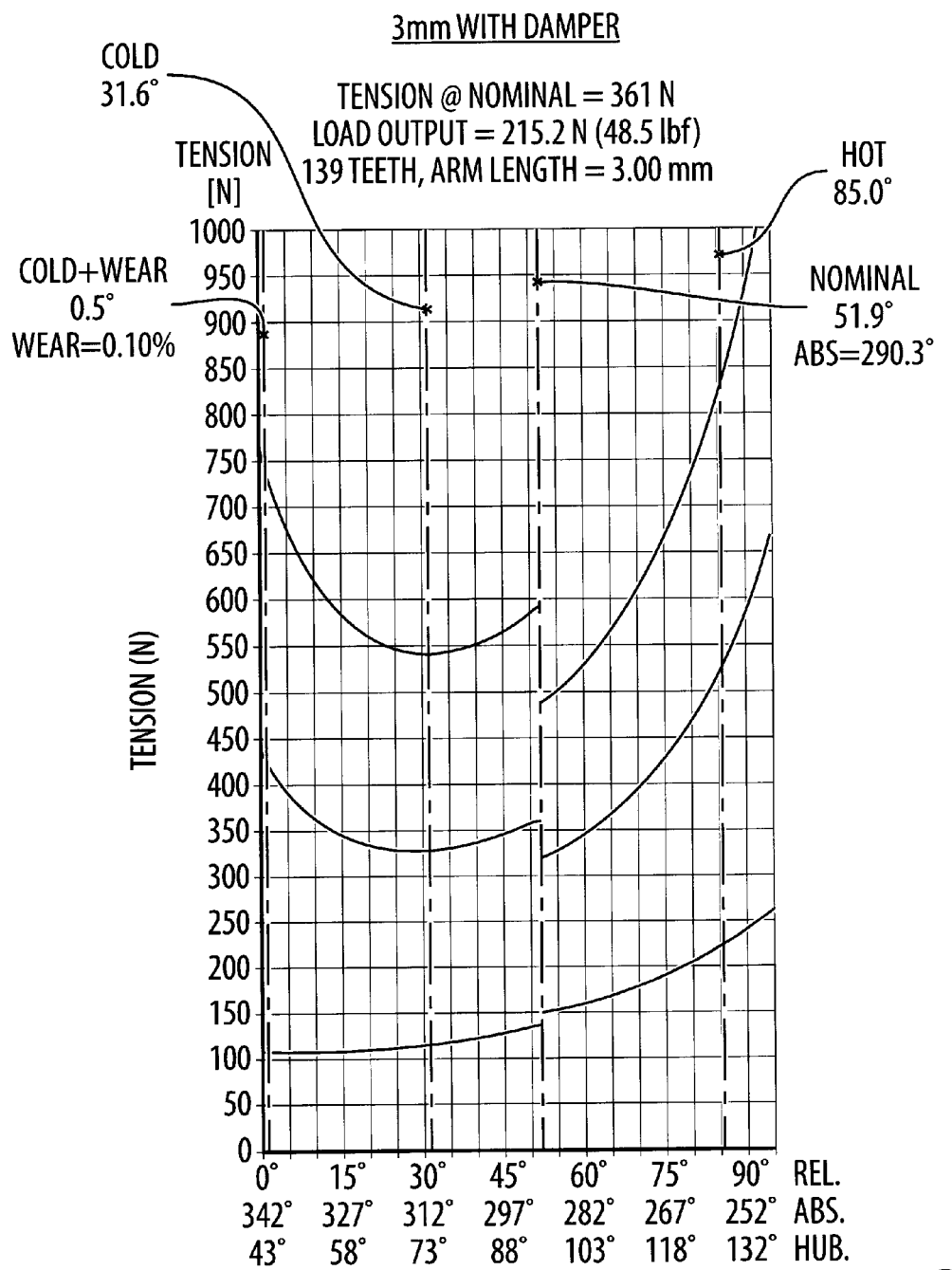
Figure 15D:
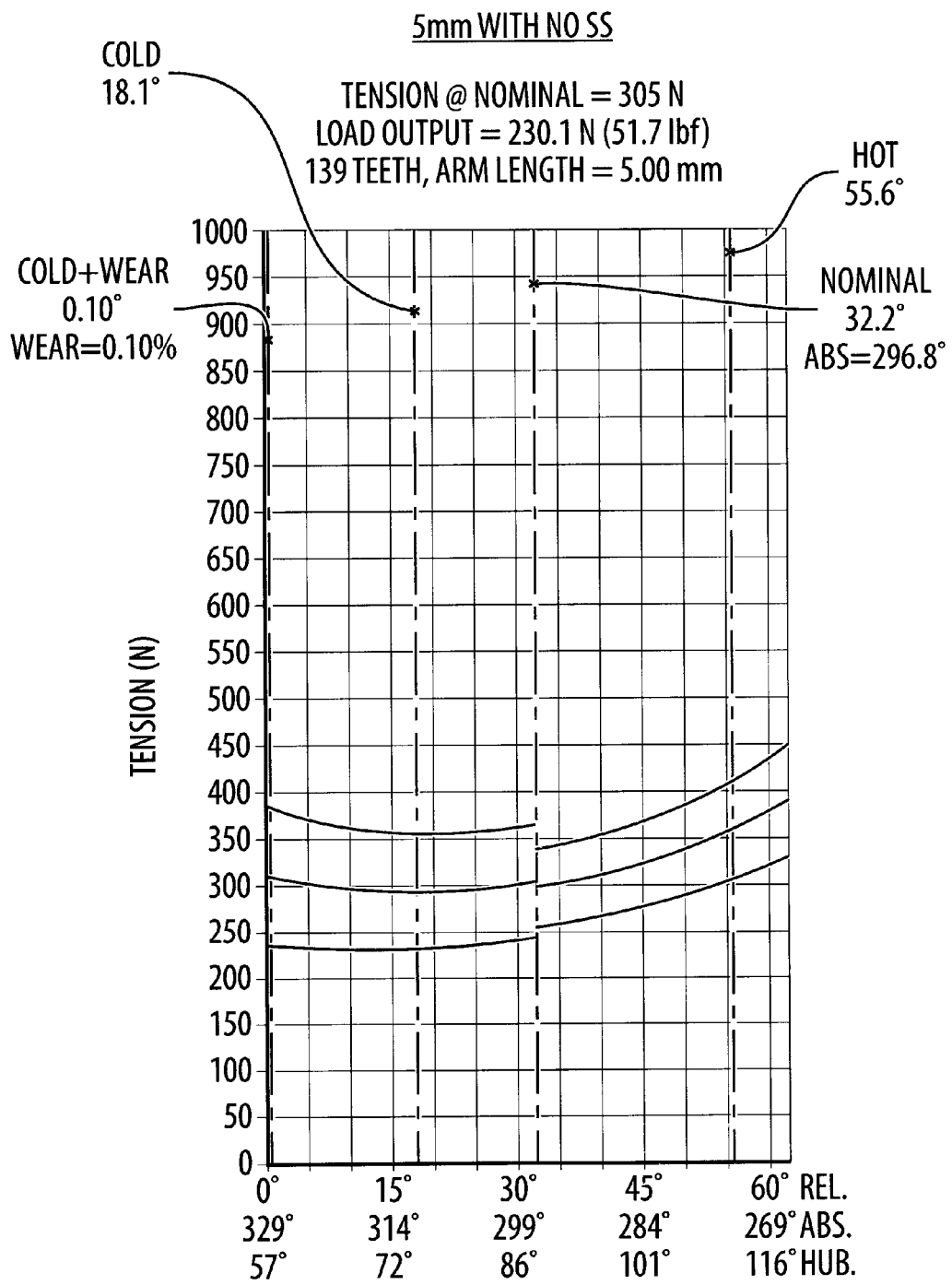
Figure 15E:
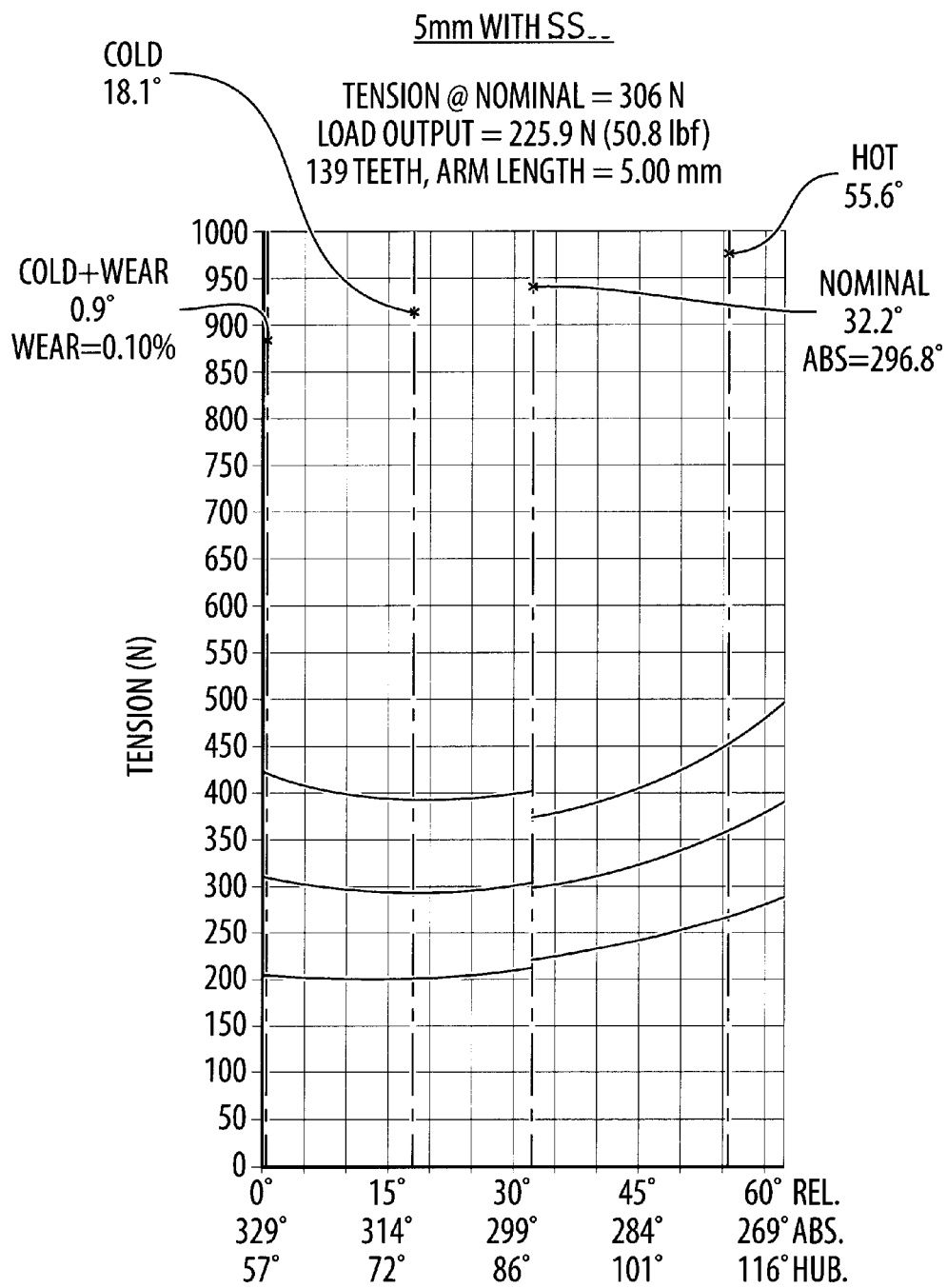
Figure 15F:
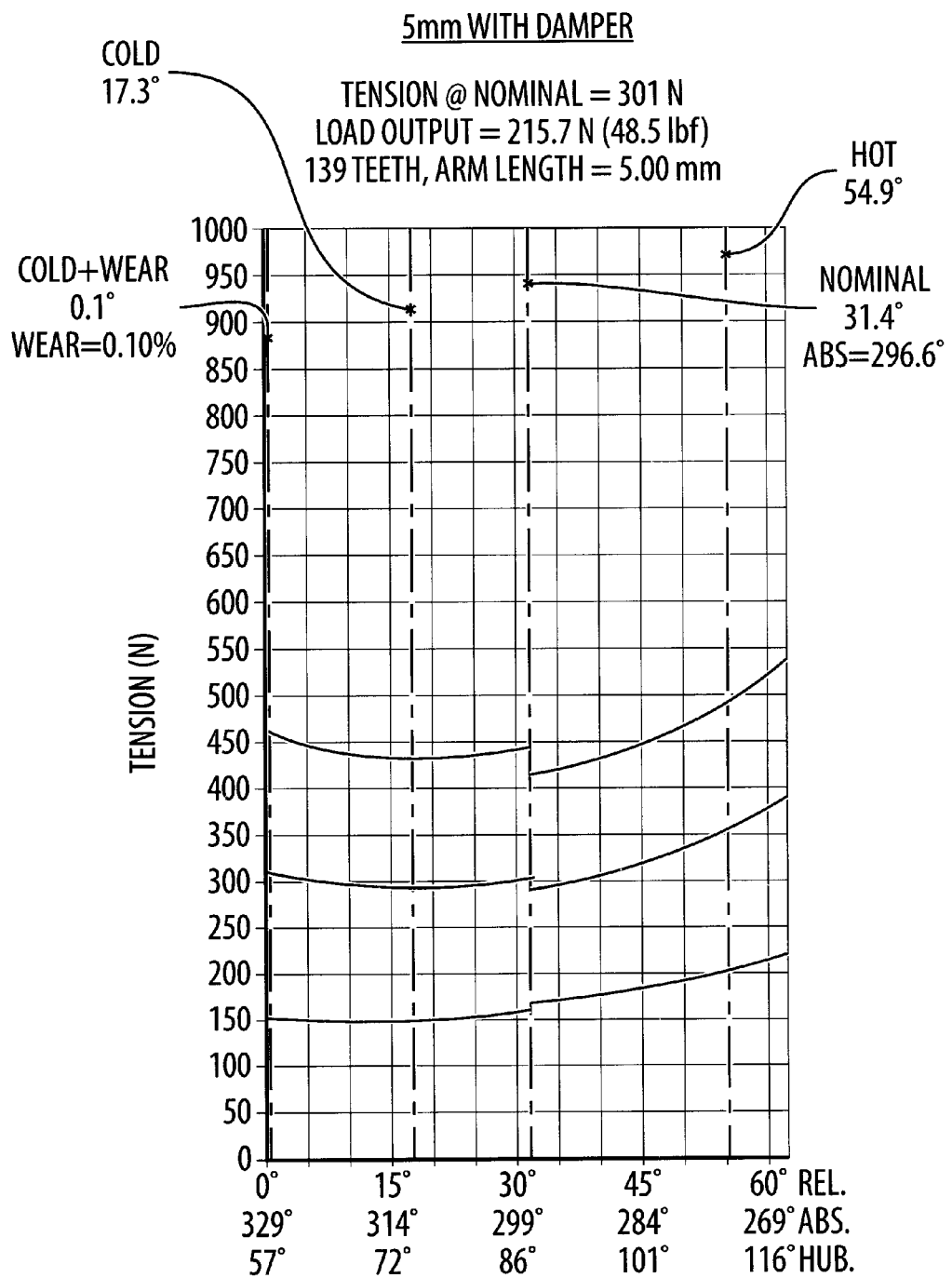
Figure 15G:
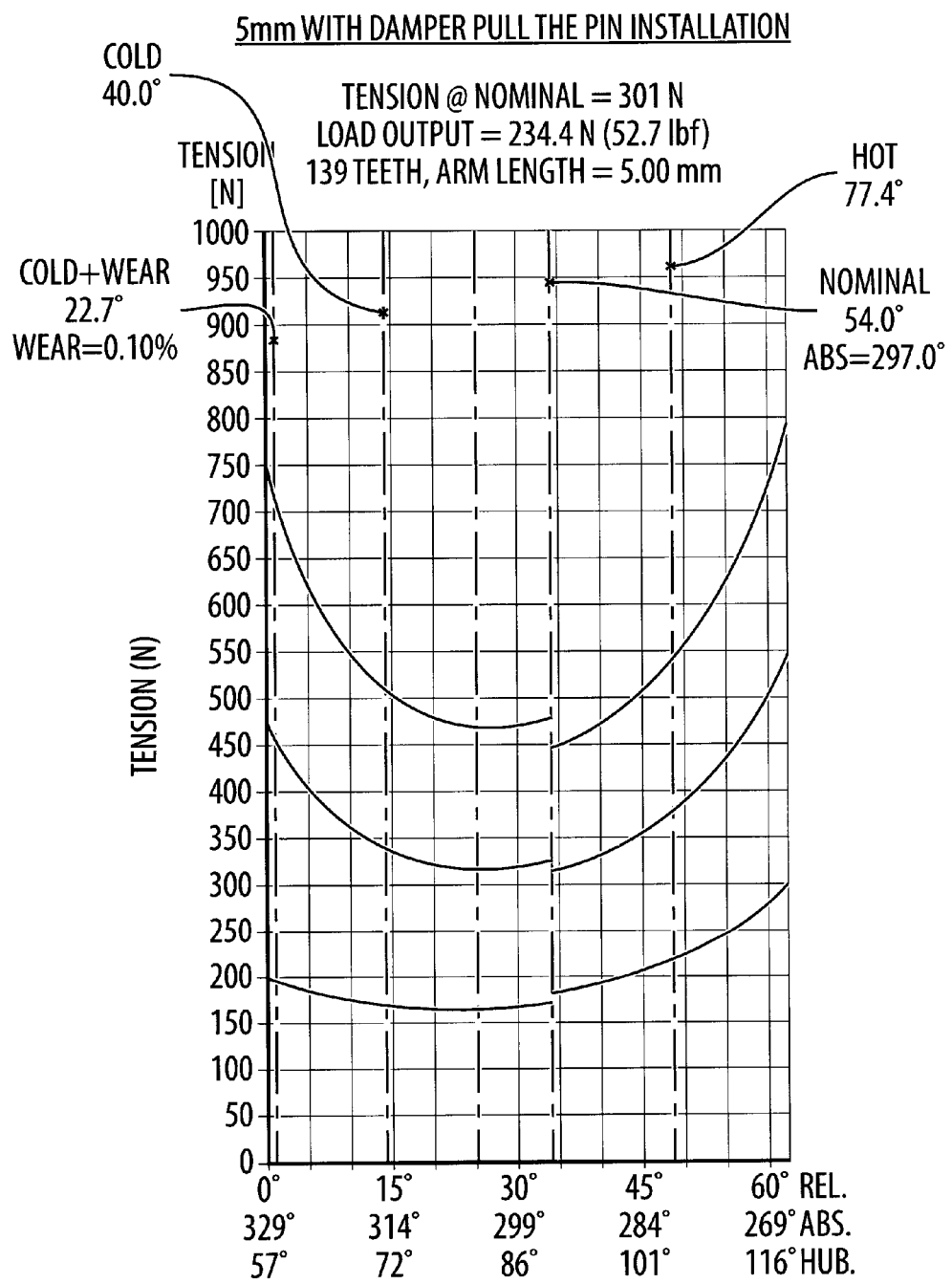
Figure 16:
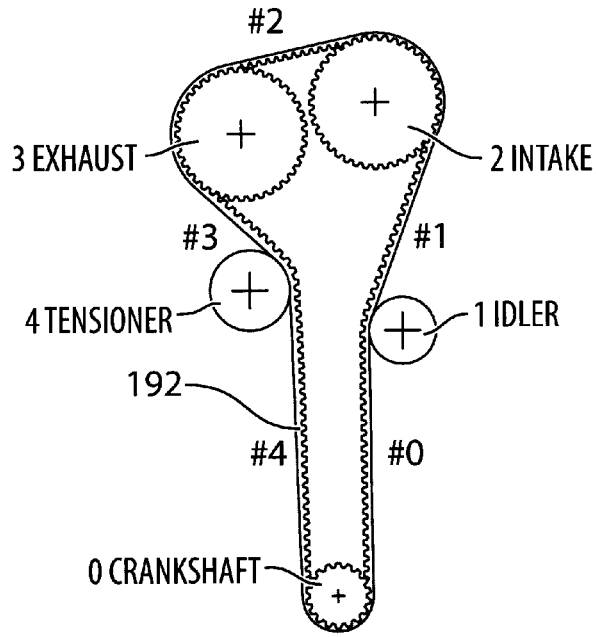
FIG. 16 is a diagram illustrating the setup for the tensioners tested from which the curves in FIGS. 15A-15G were generated.

The graphs in FIGS. 15A-15G illustrate tension control provided by the tensioner 100. There are three curves shown in each graph. The top curve represents high tension (i.e. the tensioner 100 is pushed out by the belt shown at 192 in FIG. 16); the bottom curve is low tension (i.e. the tensioner 100 follows a slack belt 192) and the center curve is the mathematical average of two extreme forces for each tensioner arm position. The graphs illustrate the performance of various tensioner configurations (e.g. different lengths of tensioner arm, use of spring support 24, use of damping element 124, no damping element). The graphs in FIGS. 15A-15C represent a tensioner with a 3 mm arm length with no spring support, a tensioner with a 3 mm arm length with a spring support similar to spring support 24, and a tensioner with a 3 mm arm length with a damper similar to damper 124 respectively. The graphs shown in FIGS. 15D-15F represent a tensioner with a 5 mm arm length with no spring support, a tensioner with a 5 mm arm length with a spring support similar to spring support 24, and a tensioner with a 5 mm arm length with a damper similar to damper 124 respectively. The graph in FIG. 15G shows a 5 mm arm tensioner with a damper similar to damper 124 and extra travel to allow for installation of a pull pin (100 degrees travel vs 62 degrees travel for a standard installation method). The increased travel creates the challenge to control tension in a stable manner. Tension curves from the graphs in FIGS. 15A-15G are proportional to tensioner hysteresis curves at each angular position of the tensioner arm. The distance between the top and bottom curves on each graph is proportional to the tensioner damping, such that a wider distance means that more damping is provided. The graphs are prepared assuming that damper/spring contact points are always vertically aligned, for simplicity. The damping element 124 reduces its influence when forces are not aligned (illustrated in FIGS. 18-19) which helps to stabilize tension control at the extreme positions (i.e. at the ends of its range of travel). With reduced damping, the curve representing the maximum tension force is not as steep and the distance between the maximum and minimum tensions does not grow as much as is shown on the graphs close to the end of the tensioner travel. This reduction in the distance between the maximum and minimum tensions at the extremes of travel is advantageous for tensioners that have pull pins that are removed after installation, which require extra travel to compensate for engine and belt build tolerances. In some applications, the tensioner 100 may be configured to substantially align the damping element forces when the tensioner 100 is close to the center of its travel as shown in FIG. 17. The alignment of the forces may be tailored to address a particular application requirement. For example, the tensioner 100 may be configured to have increased resistance as it approaches its load stop position so as to reduce the likelihood of actual contact with a limit surface on the tensioner that defines the load stop position.

The graphs in FIGS. 15A-15G have the same vertical scale so as to facilitate visually comparing the distance between the tension curves to draw conclusions as to which tensioner has more damping and will be more stable in use on an engine. It will be noted that:

- the 5 mm arm tensioners have more stable tension control (i.e. the curves are relatively flat) but less damping (i.e. there is a smaller distance between max and min curves);
- the 5 mm arm tensioner with the damper has more damping then the 3 mm tensioner with no damper (and will therefore oscillate less on the engine); and
- the tension characteristics of the 5 mm arm pull-the-pin installation tensioner are similar (i.e. similarly parabolic) to those of a 3 mm arm tensioner that has an installation eccentric and its associated complicated installation procedure. Providing a pull-the-pin installation feature requires more arm travel to compensate for engine and belt dimensional tolerances. It can be difficult to design a pull-the-pin type tensioner with a 3 mm arm length due to arm "over center" condition, whereby the tensioner arm locks up due to the geometry of the forces acting on it.

The tensioner 100 can provide good damping even in the presence of oil facilitates its use in a belt-in-oil arrangement, as a replacement for a timing chain design on an engine. For greater certainty however, it will be noted that the tensioner 100 may be advantageous in applications where no oil is present.

While the damping element 124 has been described as being made from nylon, other materials may be used, such as nylon with a Teflon™ coating on the inner surface (i.e. the surface that contacts the arm 118) or on the outer surface (i.e. the surface that contacts the spring 122) or on both the inner and outer surfaces. The spring 122 could be coated with a low friction material if desired so as to reduce wear that might occur on the damping element 124. Materials and coatings may be selected so that damping and wear characteristics may be as desired for a particular application.

Providing the tensioner 100 which has a plurality of axially spaced segments of the spring 122 in contact with the damping element 124 permits an improvement in damping which can facilitate the use of the tensioner 100 in a belt-in-oil application and/or the use of a longer arm tensioner than is possible using some damping structures of the prior art.

While a spring 122 having 2.5 coils in helical length is shown in the figures, it will be understood that the spring 122 could have fewer or more than 2.5 coils. For example, the spring 122 could have 1.5 coils and still have ends that are 180 degrees apart angularly, and would still have two segments that engage the damping element 124. In another example, the spring 122 could have 1.25 coils of helical length and would have ends that are 90 degrees apart angularly, while still having two segments that engage the damping element, although the forces applied at the spring ends would add in a vector sum of about 1.4F in such an instance. Other spring lengths are possible, such that three, four or any suitable number of segments of the spring 122 would engage a suitably lengthened version of the damping element 124.

The above-described embodiments are intended to be examples only, and alterations and modifications may be carried out to those embodiments by those of skill in the art.

The invention claimed is:

1. A tensioner for an endless drive member, comprising:
   a shaft and a base that are mountable to be stationary relative to an engine;
   a tensioner arm that is pivotable relative to the shaft about a tensioner arm axis;
   a pulley on the tensioner arm rotatable about a pulley axis that is offset from the tensioner arm axis, wherein the pulley is engageable with the endless drive member;
   a tensioner spring having a first end on a first end coil that is positioned to exert a force on the shaft and the base and a second end on a second end coil that is positioned to exert a force on the tensioner arm to urge the tensioner arm towards a free arm position; and
   a damping element that engages the tensioner arm and that is engaged by a plurality of axially spaced segments of the tensioner spring, including a segment that is on the second end coil having the second end,
   wherein the tensioner is in a belt-in-oil arrangement.

2. A tensioner as claimed in claim 1, wherein the plurality of axially spaced segments are positioned on two end coils of the tensioner spring.

3. A tensioner as claimed in claim 2, wherein the plurality of axially spaced segments includes at least one segment of the tensioner spring positioned between the two end coils.

4. A tensioner as claimed in claim 1, wherein the tensioner spring is generally helical and has a first end and a second end, wherein torsional forces are transmitted into the spring via the first and second ends, and wherein the first and second ends are angularly 180 degrees apart from each other about an axis of the tensioner spring.

5. A tensioner as claimed in claim 1, wherein the tensioner spring is made from a wire having a generally rectangular cross-section.

6. A tensioner as claimed in claim 1, wherein the tensioner spring is made from a wire having a generally square cross-section.

7. A tensioner as claimed in claim 1, wherein the damping element has an inside face that contacts the tensioner arm and wherein the inside face includes channels.

8. A tensioner as claimed in claim 1, wherein the damping element has a wall that contacts the tensioner arm and wherein the wall has flex joints that extend axially along an axial length of the wall to permit an effective reduction in radius of the wall to increase the contact area between the wall and the tensioner arm under a compressive force from the tensioner spring.

9. A tensioner as claimed in claim 1, wherein there is relative sliding movement between the tensioner spring and the damping element and a consequent frictional torque provided thereby.

10. A tensioner as claimed in claim 1, wherein the damping member is stationary relative to the base.

11. A drive arrangement, comprising:
a crankshaft;
an endless drive member driven by the crankshaft; and
a tensioner for the endless drive member, including a shaft and a base that are mountable to be stationary relative to an engine;
a tensioner arm that is pivotable relative to the shaft about a tensioner arm axis;
a pulley on the tensioner arm rotatable about a pulley axis that is offset from the tensioner arm axis, wherein the pulley is engageable with the endless drive member;
a tensioner spring having a first end on a first end coil that is positioned to exert a force on the shaft and the base and a second end on a second end coil that is positioned to exert a force on the tensioner arm to urge the tensioner arm towards a free arm position; and
a damping element that engages the tensioner arm and that is engaged by a plurality of axially spaced segments of the tensioner spring, including a segment that is on the second end coil having the second end,
wherein the damping element and the tensioner spring are lubricated with oil.

12. A drive arrangement as claimed in claim 11, wherein the plurality of axially spaced segments are positioned on two end coils of the tensioner spring.

13. A drive arrangement as claimed in claim 12, wherein the plurality of axially spaced segments includes at least one segment of the tensioner spring positioned between the two end coils.

14. A drive arrangement as claimed in claim 11, wherein the tensioner spring is generally helical and has a first end and a second end, wherein torsional forces are transmitted into the spring via the first and second ends, and wherein the first and second ends are angularly 180 degrees apart from each other about an axis of the tensioner spring.

15. A drive arrangement as claimed in claim 11, wherein the tensioner spring is made from a wire having a generally rectangular cross-section.

16. A drive arrangement as claimed in claim 11, wherein the tensioner spring is made from a wire having a generally square cross-section.

17. A drive arrangement as claimed in claim 11, wherein the damping element has an inside face that contacts the tensioner arm and wherein the inside face includes channels.

18. A drive arrangement as claimed in claim 11, wherein the damping element has a wall that contacts the tensioner arm and wherein the wall has flex joints that extend axially along an axial length of the wall to permit an effective reduction in radius of the wall to increase the contact area between the wall and the tensioner arm under a compressive force from the tensioner spring.

19. A drive arrangement as claimed in claim 11, wherein there is relative sliding movement between the tensioner spring and the damping element and a consequent frictional torque provided thereby.

20. A drive arrangement as claimed in claim 11, wherein the damping member is stationary relative to the base.

* * * * *